(12) United States Patent
Iizuka et al.

(10) Patent No.: US 12,296,743 B2
(45) Date of Patent: May 13, 2025

(54) WORK VEHICLE

(71) Applicant: Kubota Corporation, Osaka (JP)

(72) Inventors: Hiroaki Iizuka, Osaka (JP); Daisuke Hashimoto, Osaka (JP); Shuichi Takeshita, Osaka (JP)

(73) Assignee: Kubota Corporation, Osaka (JP)

( * ) Notice: Subject to any disclaimer, the term of this patent is extended or adjusted under 35 U.S.C. 154(b) by 328 days.

(21) Appl. No.: 18/089,794

(22) Filed: Dec. 28, 2022

(65) Prior Publication Data

US 2023/0202383 A1 Jun. 29, 2023

(30) Foreign Application Priority Data

Dec. 28, 2021 (JP) .................. 2021-214493

(51) Int. Cl.
  *B60Q 1/14* (2006.01)
  *B60Q 1/04* (2006.01)
  *E02F 3/34* (2006.01)

(52) U.S. Cl.
  CPC ......... *B60Q 1/1453* (2013.01); *B60Q 1/0483* (2013.01); *E02F 3/34* (2013.01); *B60Q 2800/20* (2022.05)

(58) Field of Classification Search
  None
  See application file for complete search history.

(56) References Cited

U.S. PATENT DOCUMENTS

| | | | |
|---|---|---|---|
| 10,106,072 B2 * | 10/2018 | Liñan | B60Q 1/085 |
| 10,450,724 B2 * | 10/2019 | Hayashibe | B60Q 1/0076 |
| 11,193,252 B2 * | 12/2021 | Torii | E02F 3/3622 |
| 11,364,838 B2 * | 6/2022 | Demski | H05B 47/11 |
| 11,562,635 B2 * | 1/2023 | Imaizumi | G01S 15/87 |
| 11,657,688 B2 * | 5/2023 | Imaizumi | H04N 7/181 |
| | | | 340/686.1 |
| 11,663,891 B2 * | 5/2023 | Imaizumi | G06V 20/58 |
| | | | 340/686.1 |
| 11,718,972 B2 * | 8/2023 | Kennedy | E02F 9/265 |
| | | | 701/50 |
| 11,807,157 B2 * | 11/2023 | Demski | B60Q 1/245 |
| 11,859,803 B2 * | 1/2024 | Bocock | H05B 45/52 |
| 2017/0120800 A1 * | 5/2017 | Liñan | B60Q 1/2657 |
| 2019/0093316 A1 * | 3/2019 | Hayashibe | B60R 16/03 |

(Continued)

FOREIGN PATENT DOCUMENTS

| | | | | |
|---|---|---|---|---|
| CA | 2969951 C | * | 2/2023 | ......... B60Q 1/0483 |
| CA | 3199275 A1 | * | 4/2024 | ............... E02F 3/34 |

(Continued)

*Primary Examiner* — Srinivas Sathiraju
(74) *Attorney, Agent, or Firm* — Osha Bergman Watanabe & Burton LLP

(57) ABSTRACT

A work vehicle includes: a vehicle body that travels; a boom attached to the vehicle body to be vertically swingable; a work tool mounted to a front portion of the boom; a first illumination lamp that is disposed in the vehicle body and emits an illumination light forward; a second illumination lamp that is disposed in the boom and emits an illumination light toward the work tool; and an illumination controller that controls the first illumination lamp and the second illumination lamp, the illumination controller executing a lighting restriction of automatically turning off or dimming the first illumination lamp while the second illumination lamp is turned on.

13 Claims, 13 Drawing Sheets

(56) References Cited

U.S. PATENT DOCUMENTS

| | | | |
|---|---|---|---|
| 2020/0071905 A1* | 3/2020 | Lee | E02F 3/3405 |
| 2020/0141088 A1* | 5/2020 | Myers | E02F 3/431 |
| 2021/0123207 A1* | 4/2021 | Vandegrift | E02F 9/2012 |
| 2021/0136899 A1* | 5/2021 | Elwell | B60Q 1/0035 |
| 2021/0402914 A1* | 12/2021 | Demski | H05B 45/10 |
| 2021/0402916 A1* | 12/2021 | Demski | B60Q 1/085 |
| 2021/0402917 A1* | 12/2021 | Demski | B60K 35/00 |
| 2022/0145591 A1* | 5/2022 | Wu | E02F 9/26 |
| 2022/0145592 A1* | 5/2022 | Zimmerman | G01G 5/04 |
| 2022/0228349 A1* | 7/2022 | Williams | E02F 3/434 |
| 2022/0290399 A1* | 9/2022 | Torii | E02F 3/382 |
| 2022/0403622 A1* | 12/2022 | Abd El Salam Mohamed | E02F 9/265 |
| 2023/0049522 A1* | 2/2023 | Flatman | H04N 23/74 |
| 2023/0202383 A1* | 6/2023 | Iizuka | B60Q 1/0483 315/82 |
| 2023/0279643 A1* | 9/2023 | Wuisan | H04N 7/183 |
| 2024/0133151 A1* | 4/2024 | Faivre | E02F 9/265 |
| 2024/0150992 A1* | 5/2024 | Kumbhar | E02F 3/3408 |
| 2024/0229413 A9* | 7/2024 | Faivre | E02F 3/34 |

FOREIGN PATENT DOCUMENTS

| | | | | |
|---|---|---|---|---|
| DE | 102020204776 A1 * | 11/2020 | | B60Q 1/0023 |
| JP | 2018114927 A | 7/2018 | | |

\* cited by examiner

WORK VEHICLE

BACKGROUND

Technical Field

The present invention relates to a work vehicle such as a tractor.

Description of Related Art

Conventionally, the work vehicle disclosed in patent literature 1 is known.

The work vehicle disclosed in patent literature 1 is provided with an illumination lamp (work lamp) for providing illumination in front of a vehicle body. The illumination lamp is respectively provided in left and right positions of a front end of an upper portion of a cabin and can provide illumination in front of the vehicle body from a position above a viewpoint of a driver when working in an environment needing illumination such as nighttime or in overcast weather.

PATENT LITERATURE

[Patent Literature 1] JP 2018-114927 A

However, in the conventional work vehicle above, when working by having a front loader mounted to the vehicle body, when the front loader is raised to a predetermined position or higher, light from the illumination lamp is reflected by left and right booms of the front loader and a connecting frame connecting these booms to each other. As a result, a state of a work area in front of the vehicle body and a periphery of a work tool mounted to a front portion of the booms can no longer be appropriately viewed.

SUMMARY

One or more embodiments of the present invention provide a work vehicle that, when working by having mounted to a vehicle body, for example, a front loader having a boom, can suppress light from an illumination lamp providing illumination in front of the vehicle body from being reflected by the boom or the like and blocking the view and enables a state of a work area and a periphery of a work tool to be appropriately viewed.

The present invention adopts the following technical means to achieve technological improvements.

A work vehicle of one or more embodiments of the present invention is provided with: a vehicle body that travels; a boom attached to the vehicle body to be vertically swingable; a work tool mounted to a front portion of the boom; a first illumination lamp that is disposed in the vehicle body and emits an illumination light forward; a second illumination lamp that is disposed in the boom and emits an illumination light toward the work tool; and an illumination control unit (i.e., illumination controller) that controls the first illumination lamp and the second illumination lamp; wherein the illumination control unit executes a lighting restriction of automatically turning off or dimming the first illumination lamp while the second illumination lamp is turned on.

In one or more embodiments, the illumination control unit executes the lighting restriction while the boom is raised to a predetermined position or higher.

In one or more embodiments, the illumination control unit cancels the lighting restriction while the boom is below a predetermined position.

In one or more embodiments, the predetermined position is a position wherein a height of at least a portion of the boom is identical to a height of the first illumination lamp.

In one or more embodiments, further provided is an illumination switch for manually turning the second illumination lamp on and off; wherein the illumination control unit executes the lighting restriction based on an operation of turning on the illumination switch.

In one or more embodiments, further provided is a boom position detector that detects a position of the boom; wherein the illumination control unit switches between executing and canceling the lighting restriction based on position detection information obtained from the boom position detector.

In one or more embodiments, further provided is an operation lever for manually operating the boom; wherein the illumination switch is disposed on the operation lever.

In one or more embodiments, the second illumination lamp is disposed in a lower edge portion of the boom.

In one or more embodiments, the second illumination lamp is configured to be capable of directing the illumination light to in front of and behind the work tool.

In one or more embodiments, further provided is a bracket that is connected to the boom and supports the second illumination lamp; and cables disposed along the boom, wherein a gap is defined between mutually opposing faces of the boom and the bracket, and the cables can be inserted in the gap.

In one or more embodiments, the bracket has a flange on an outer edge portion of a face portion opposing the boom, and the flange prevents the cables from contacting the second illumination lamp.

In one or more embodiments, the flange extends outward from the outer edge portion and is inclined in a direction of widening the gap.

In one or more embodiments, further provided is a cabin mounted on the vehicle body and comprises a roof, wherein the boom comprises a left boom disposed on a left side of the boom and a right boom disposed on a right side of the boom, the first illumination lamp is disposed in each of a left front portion and a right front portion of the roof, and the second illumination lamp is disposed in each of the left boom and the right boom.

According to the above work vehicle, light from a first illumination lamp being reflected by a boom or the like and blocking the view can be prevented. As such, visibility of a work area and a periphery of a work tool when using illumination is significantly improved.

DETAILED DESCRIPTION OF EMBODIMENTS

Embodiments of the present invention are described below with reference to the drawings.

<Work Vehicle>

Figure 1:
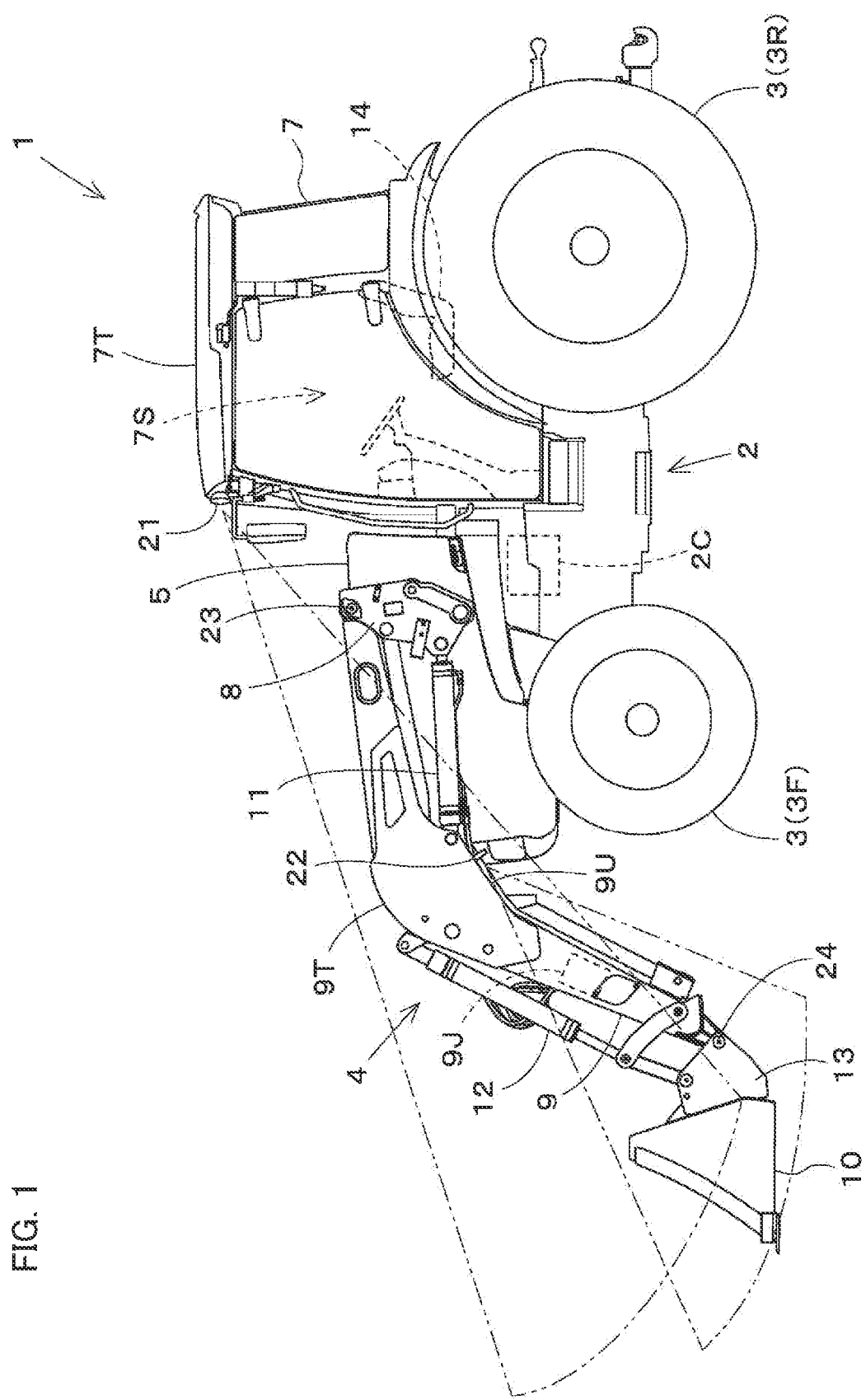
FIG. 1 is a side view of a work vehicle in a state wherein a front loader is lowered.
Figure 2:
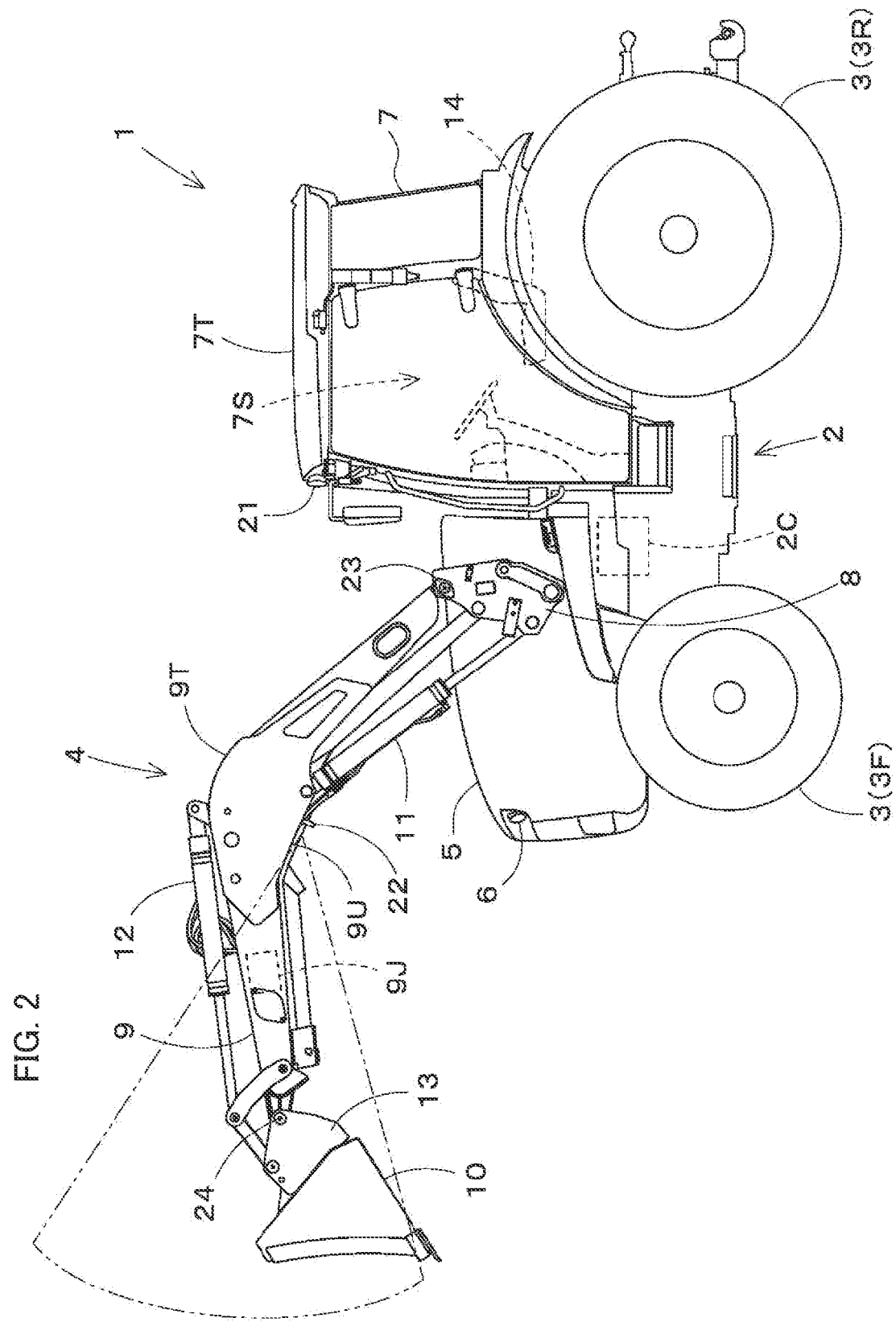
FIG. 2 is a side view of the work vehicle in a state wherein the front loader is raised.

FIG. 1 and FIG. 2 are a side view of a work vehicle 1 of one or more embodiments of the present invention. The work vehicle 1 of one or more embodiments is a tractor. Note that the work vehicle 1 is not limited to a tractor and may be another type of work vehicle.

Hereinbelow, a direction wherein the work vehicle 1 moves forward and rearward (left-right direction in FIG. 1 and FIG. 2) is described as a front-rear direction, a direction horizontally orthogonal to the direction wherein the work vehicle 1 moves forward and rearward (proximal-distal direction in FIG. 1 and FIG. 2) is described as a left-right direction, and a direction vertically orthogonal to the direction wherein the work vehicle 1 moves forward and rearward (up-down direction in FIG. 1 and FIG. 2) is described as an up-down direction. Moreover, a left-right direction of the work vehicle 1 is described as a width direction of a vehicle body 2, a direction in the width direction of the vehicle body 2 moving away from a center in this width direction is described as an outward direction of the vehicle body 2, and a direction in the width direction of the vehicle body 2 moving toward the center in this width direction is described as an inward direction of the vehicle body 2.

The work vehicle 1 is provided with the vehicle body 2 and a travel apparatus 3. A front loader 4 is mounted to a front portion of the vehicle body 2. The vehicle body 2 is configured to be able to travel. Specifically, a bonnet 5 is provided in the front portion of the vehicle body 2. An engine and the like are housed inside the bonnet 5. A clutch housing, a transmission case, a raising and lowering apparatus, and the like are provided in a rear portion of the vehicle body 2. The travel apparatus 3 has a front wheel 3F provided in the front portion of the vehicle body 2 and a rear wheel 3R provided in the rear portion of the vehicle body 2. Note that the rear wheel 3R is supported by an output shaft of a rear-wheel differential. The rear wheel 3R may be a tire or a continuous track.

A front illumination lamp 6 is provided in a front portion of the bonnet 5. A cabin 7 boarded by a driver is provided in an upper portion of the vehicle body 2. That is, the cabin 7 is equipped on the vehicle body 2. Moreover, the vehicle body 2 is equipped with a control device 2C that controls a travel system and a work system. The control device 2C is provided with a computation unit (such as a CPU), a storage unit (memory), and the like and executes various controls of the work vehicle 1 based on a program stored in the storage unit. More specifically, the control device 2C controls the travel system and the work system of the work vehicle 1 based on operation signals from when various operation apparatuses disposed in the cabin 7 (such as an operation lever, a switch, and a dial) are operated, detection signal of sensors provided in various locations of the vehicle body 2, and the like. For example, the control device 2C executes control of an engine speed based on a detection signal from an acceleration-pedal sensor, control relating to shifting of a gearbox based on an operation signal from an operation apparatus, control relating to operation of the front loader 4, and the like.

Figure 3:
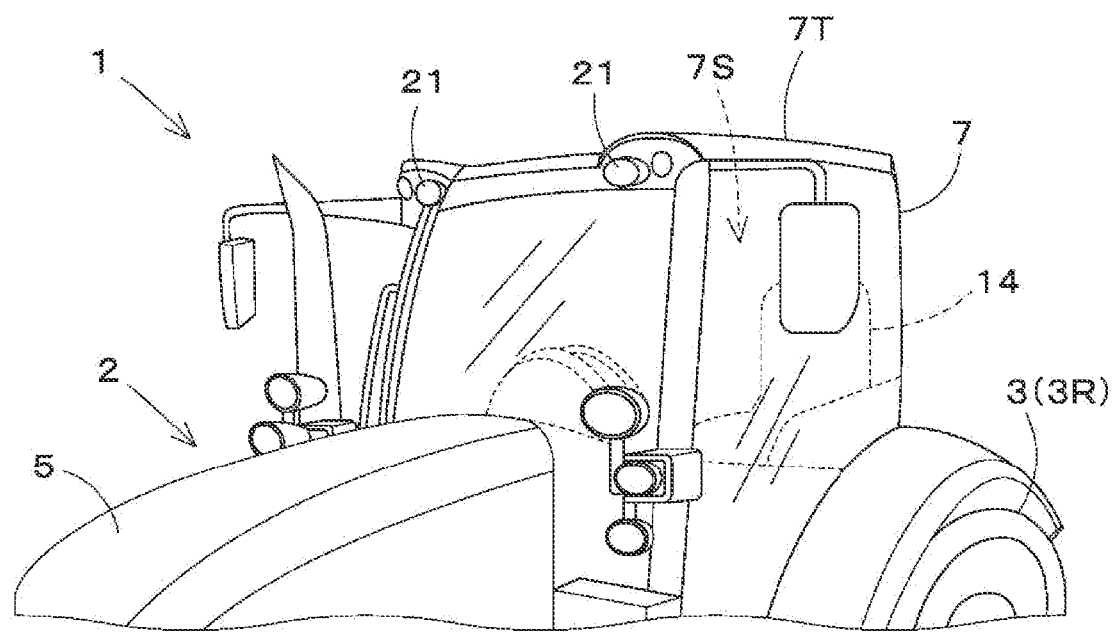
FIG. 3 is a front perspective view of a periphery of an upper portion of a cabin.
Figure 4:
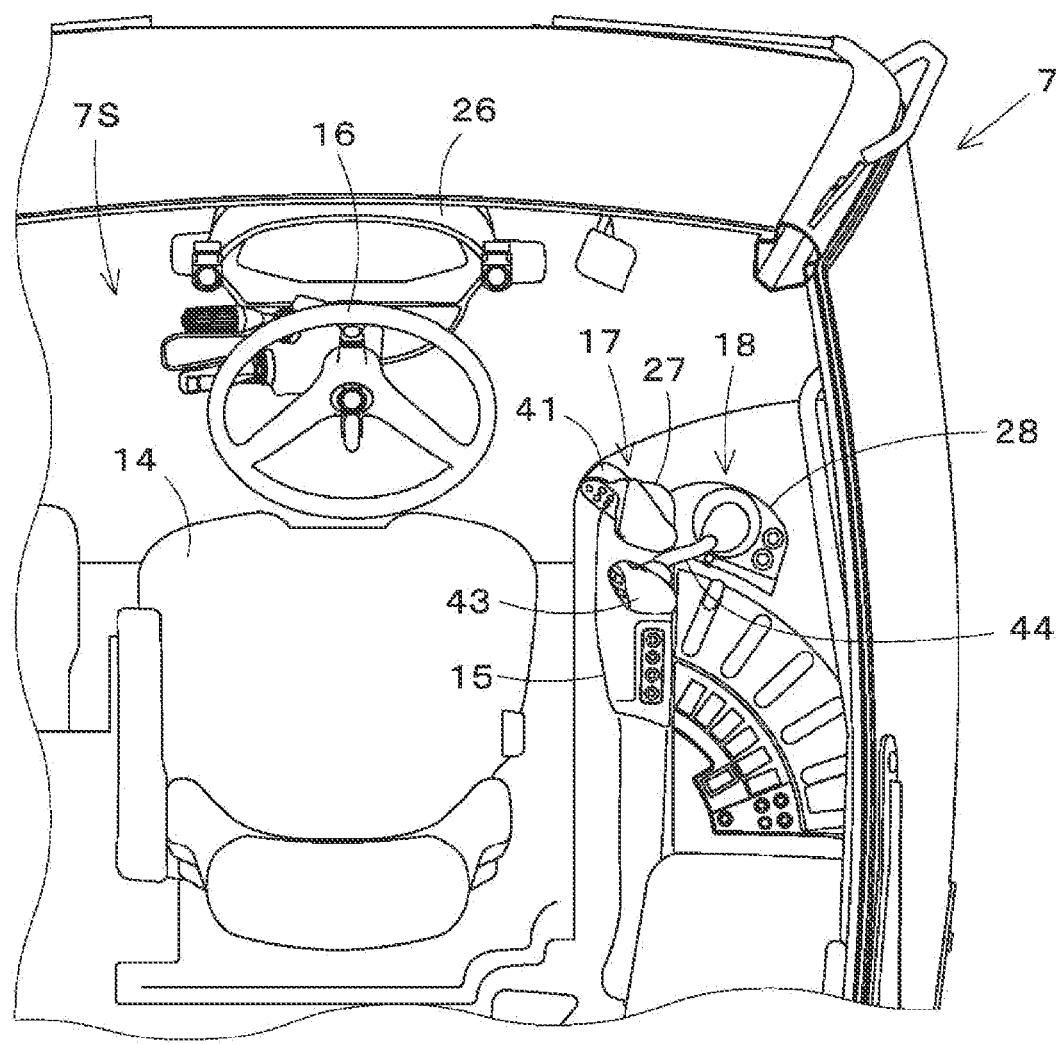
FIG. 4 is a top view of a cabin interior.

As illustrated in FIG. 1 to FIG. 3, a work light 21 is provided in an upper portion of the cabin 7. The work light 21 is an illumination lamp (first illumination lamp) that is disposed in the vehicle body 2 and provides illumination in front of the vehicle body 2. The work light 21 is respectively provided in a left front portion and a right front portion of a roof 7T of the cabin 7. Specifically, the work light 21 is respectively provided in left and right positions in a front portion of the roof 7T covering a seat 14 from above; turning on the work light provides illumination of a work area in front of the vehicle body 2 from a position above a viewpoint of the driver who has boarded the cabin 7. As illustrated in FIG. 4, an interior (driver's-seat portion) 7S of the cabin 7 is provided with the seat 14, an armrest 15, a steering wheel 16, a multifunctional operation lever 17, and a loader operation lever 18.

The seat 14 is provided in a substantially central portion in terms of left and right in the cabin 7, and the driver sits in a forward-facing posture in the seat 14. The armrest 15 is provided adjacently on one side of the seat 14. In one or more embodiments, the armrest 15 is provided on a right side of the seat 14. The armrest 15 extends in a front-rear direction of the seat 14.

<Front Loader>

Figure 5:
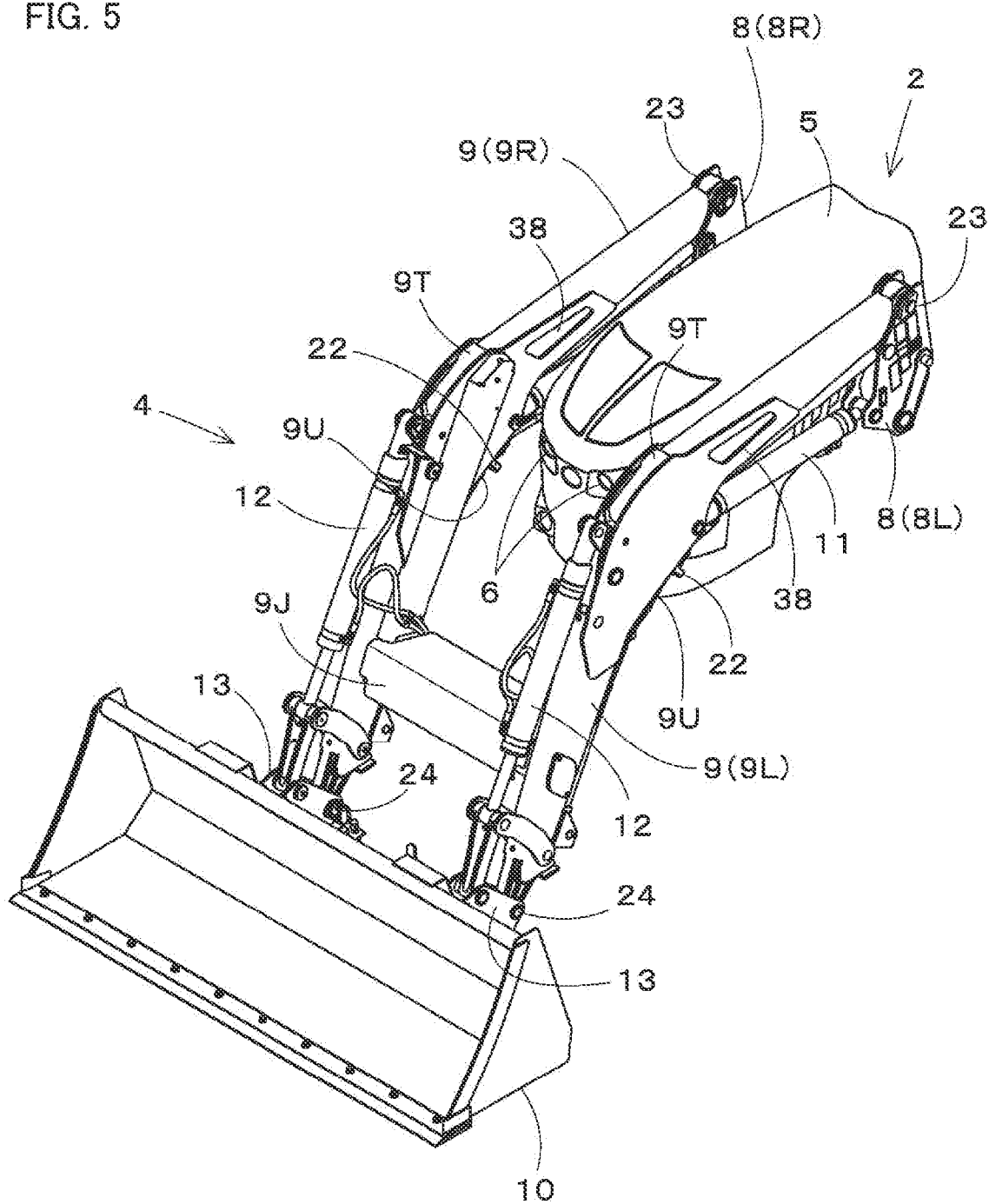
FIG. 5 is a front perspective view of a periphery of the front loader.

As illustrated in FIG. 1, FIG. 2, and FIG. 5, the front loader 4 is provided with an attachment frame 8, a boom 9, a bucket 10, a boom cylinder 11, and a bucket cylinder 12. Moreover, the front loader 4 is provided with a loader light (second illumination lamp) 22. In one or more embodiments, the loader light 22 is disposed in a lower edge portion 9U of the boom 9. However, the loader light 22 may be provided in a position other than the lower edge portion 9U of the boom 9 (for example, a side face portion of the boom 9). Note that the front loader 4 is not limited to the above embodiments as long as it has the boom 9 and a work tool (bucket 10). Moreover, the work tool is not limited to the bucket 10 and may be another type of work tool such as a pallet fork, a sweeper, a mower, a snowblower, or the like.

As illustrated in FIG. 5, the attachment frame 8 has a left frame 8L and a right frame 8R. The left frame 8L and the right frame 8R are respectively detachably attached on a left side and a right side of the vehicle body 2. The front loader 4 is mounted to the vehicle body 2 via the attachment frame 8.

The boom 9 is attached to the vehicle body 2 so as to be able to swing up and down. The boom 9 has a left boom 9L disposed on the left side of the vehicle body 2 and a right boom 9R disposed on the right side of the vehicle body 2. In one or more embodiments, the left boom 9L and the right boom 9R are elongated, substantially rectangular-cylindrical bodies and are formed substantially in a V shape, in a side view, wherein a substantially central portion in the front-rear direction is bent at an obtuse angle. Note that the left boom 9L and the right boom 9R are not limited to a substantially rectangular-cylindrical body and may be another shape. A rear end portion of the left boom 9L is connected to and supported by a pivot 23, disposed in the left frame 8L, so as to be able to swing around the pivot. A rear end portion of the right boom 9R is connected to and supported by the pivot 23, disposed in the right frame 8R, so as to be able to swing around the pivot. The left boom 9L and the right boom 9R are connected to each other by a connecting frame 9J in a position more toward a front end than a center in the front-rear direction. This causes the left boom 9L and the right boom 9R to swing integrally around the pivot 23. In one or more embodiments, the boom 9 (left boom 9L, right boom 9R) is configured to be able to swing up and down in a substantially 90-degree range from a lower position wherein the bucket 10 is disposed in front of and below the vehicle body 2 to an upper position wherein the bucket 10 is disposed above the vehicle body 2.

The bucket (work tool) 10 is mounted to a front portion of the boom 9. The bucket 10 is mainly used to scoop or push forward earth or the like in the work area in front of the vehicle body 2 and, at a connecting bracket 13 provided in a rear portion of the bucket 10, is connected to and supported by a pivot 24 disposed in a front end portion of the boom 9 so as to be able to swing around the pivot.

The boom cylinder 11 is respectively provided on a lower-face side of the left boom 9L and the right boom 9R and connects the attachment frame 8 and the boom 9. One end portion of the boom cylinder 11 is rotatably pivoted on the attachment frame 8. Another end portion of the boom cylinder 11 is rotatably pivoted on a front-rear-direction intermediate portion of the boom 9. The boom cylinder 11 is constituted by a hydraulic cylinder, swinging the boom 9 upward around the pivot 23 by extending and swinging the boom 9 downward around the pivot 23 by contracting. In one or more embodiments, a hydraulic hose 25 connected to the boom cylinder 11 is disposed along the lower edge portion (boom lower edge portion) 9U of the boom 9.

The bucket cylinder 12 is respectively provided on an upper-face side of the left boom 9L and the right boom 9R and connects the bucket 10 and the boom 9. One end portion of the bucket cylinder 12 is rotatably pivoted on the connecting bracket 13 in the rear portion of the bucket 10. Another end portion of the bucket cylinder 12 is rotatably pivoted on the front-rear-direction intermediate portion of the boom 9. The bucket cylinder 12 is constituted by a hydraulic cylinder, swinging the bucket 10 downward around the pivot 24 by extending (dumping operation) and swinging the bucket 10 upward around the pivot 24 by contracting (scooping operation).

<Second Illumination Lamp>

Figure 6:
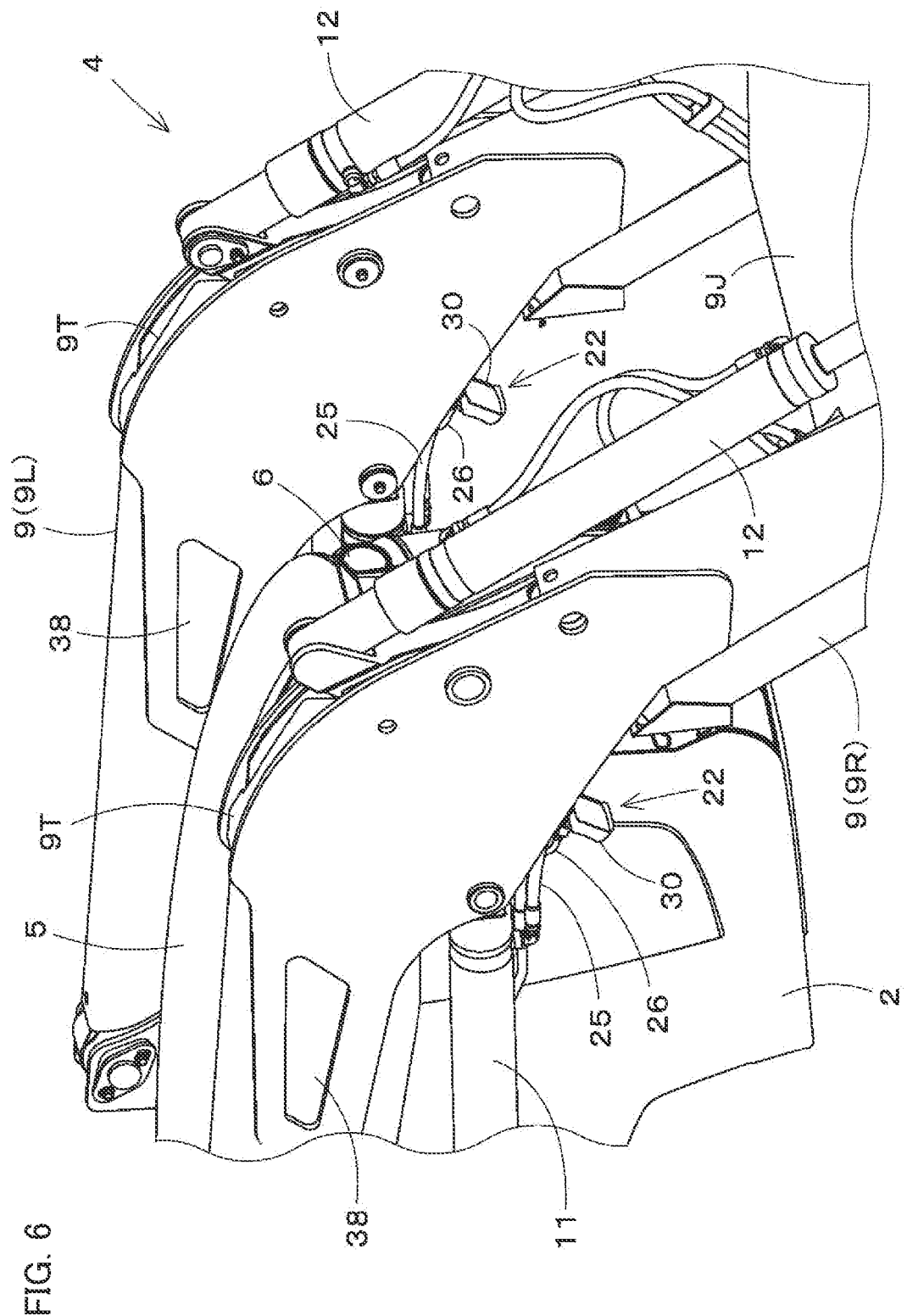
FIG. 6 is a side perspective view of a periphery of an intermediate portion of a boom.
Figure 7:
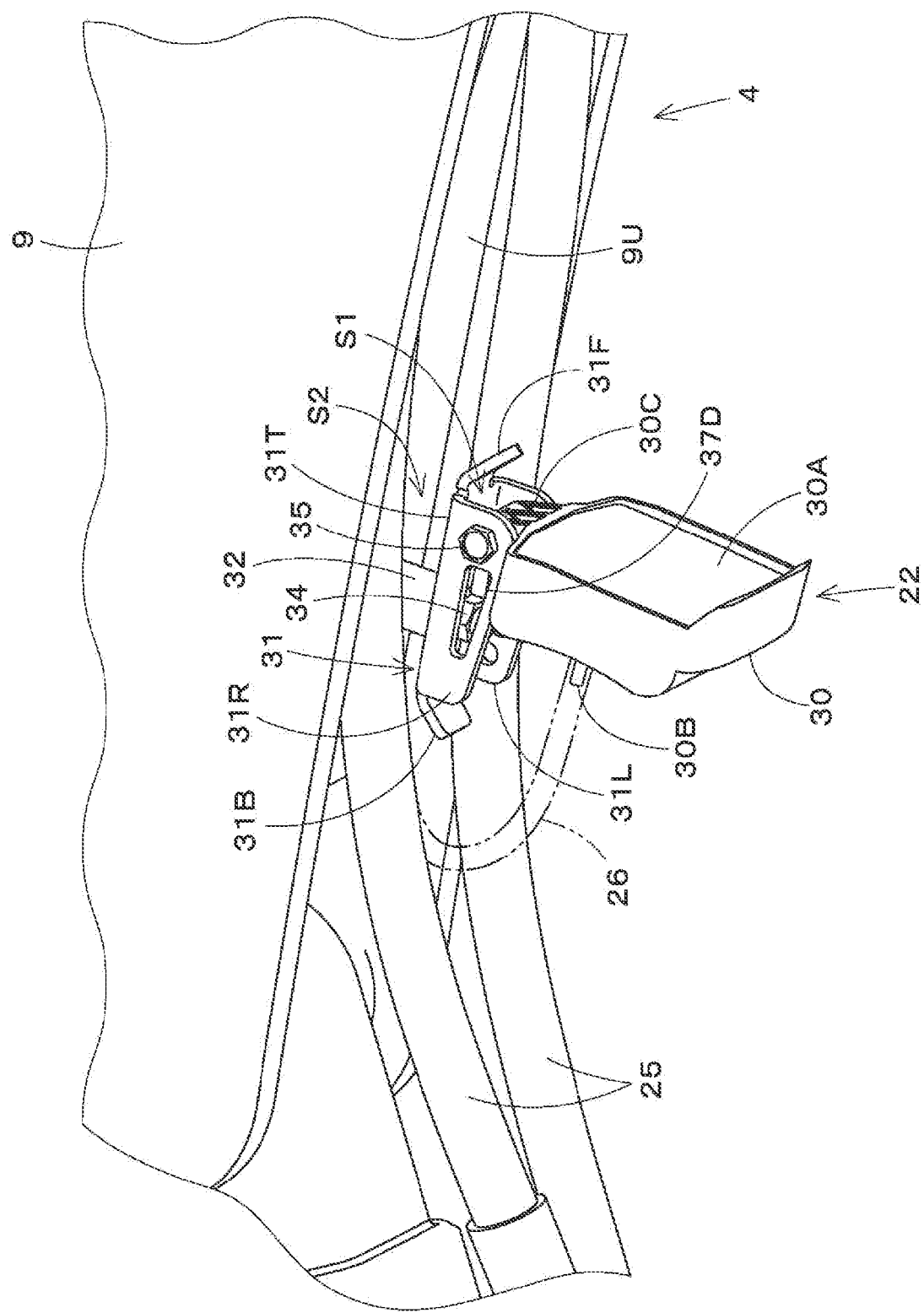
FIG. 7 is a side perspective view of a periphery of a second illumination lamp.

The loader light 22 is an illumination lamp (second illumination lamp) that is disposed in the boom 9 and illuminates a periphery of the bucket 10. As illustrated in FIG. 5 to FIG. 7, the loader light 22 is respectively disposed in the left boom 9L and the right boom 9R. Specifically, the loader light 22 is respectively disposed in a substantially central lower-edge portion in the front-rear direction (boom lower edge portion 9U) of the left boom 9L and the right boom 9R; turning it on illuminates the periphery of the bucket 10 from a position below the boom 9.

Figure 8:
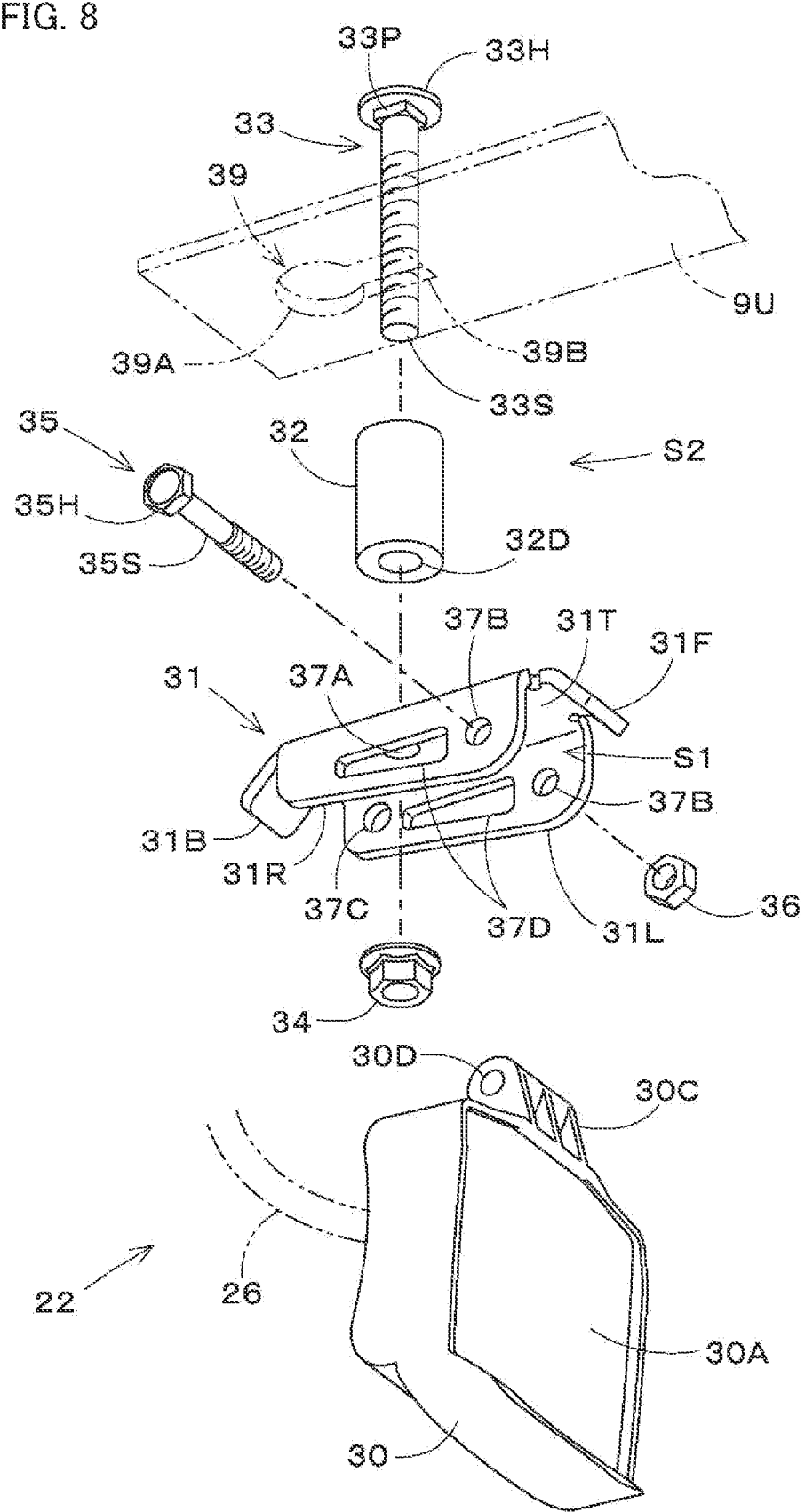
FIG. 8 is a partial exploded perspective view of the second illumination lamp.

As illustrated in FIG. 7 and FIG. 8, the loader light 22 is provided with a light main body 30, a light bracket (bracket) 31, a spacer 32, a bracket fixing bolt 33 and bracket fixing nut 34, and a light fixing bolt 35 and light fixing nut 36.

The light main body 30 has a light-emitting portion 30A, a cord connection terminal 30B, and a bracket connecting portion 30C. A bearing hole 30D penetrates the bracket connecting portion 30C across left and right portions thereof. The light main body 30 is formed in a substantially rectangular shape in a front view. The light-emitting portion 30A is provided in a front face portion of the light main body 30. The cord connection terminal 30B is provided in a rear face portion of the light main body 30. The bracket connecting portion 30C is provided in an upper portion of the light main body 30. A power cable 26 that supplies electricity to the light main body 30 is connected to the cord connection terminal 30B. In one or more embodiments, the power cable 26 is disposed along the boom lower edge portion 9U from the cord connection terminal 30B and joins a power supply device equipped on the vehicle body 2.

The light bracket 31 is connected to the boom 9 and supports the loader light 22. The light bracket 31 is provided with flanges 31F, 31B, for preventing cables and the like from contacting the loader light 22, on outer edge portions of a face portion opposing the boom 9. The flanges 31F, 31B are extended inclining in a direction of widening a gap S2 described below, toward outer sides of the outer edge portions.

Specifically, as illustrated in FIG. 8, the light bracket 31 has a top plate 31T, a left side plate 31L, a right side plate 31R, a front plate 31F, and a rear plate 31B. The top plate 31T is formed in a substantially rectangular plate shape extending front to rear and is disposed in a position opposing the boom lower edge portion 9U from below. The left side plate 31L is formed in a substantially trapezoidal plate shape (in a side view) whose rear edge portion is shorter than its front edge portion, the left side plate extending substantially vertically downward from a left side edge portion of the top plate 31T. The right side plate 31R is formed in a substantially trapezoidal plate shape (in a side view) whose rear edge portion is shorter than its front edge portion, the right side plate extending substantially vertically downward from a right side edge portion of the top plate 31T. In this manner, the left side plate 31L and the right side plate 31R extend in a substantially parallel manner along left and right outer edge portions of the top plate 31T by leaving a gap S1 of a predetermined width therebetween.

The front plate 31F is formed in a substantially rectangular plate shape, extending diagonally forward and downward from a front edge portion (outer edge portion) of the top plate 31T (face portion opposing boom 9). The rear plate 31B is formed in a substantially rectangular plate shape, extending diagonally rearward and downward from a rear edge portion (outer edge portion) of the top plate 31T (face portion opposing boom 9). In this manner, the front plate 31F and the rear plate 31B extend—from the front and rear outer edge portions of the top plate 31T, respectively-diagonally downward, in a direction wherein the boom 9 extends, so as to gradually move away from the boom lower edge portion 9U.

The top plate 31T is provided with a substantially circular shaft insertion hole 37A. The shaft insertion hole 37A is provided in a position more toward the rear than a center in the front-rear direction of the top plate 31T. The bracket fixing bolt 33 is inserted into this shaft insertion hole 37A from above the light bracket 31.

The left side plate 31L and the right side plate 31R are provided with a substantially circular shaft insertion hole 37B. The shaft insertion holes 37B are provided opposing each other in positions more toward the front than a center in the front-rear direction of the left side plate 31L and the right side plate 31R. The light fixing bolt 35 is inserted into each of these shaft insertion holes 37B from an outer side of the light bracket 31.

The left side plate 31L is provided with a substantially circular harness fixing hole 37C. The harness fixing hole 37C is provided in a position more toward the rear than the center in the front-rear direction of the left side plate 31L. In one or more embodiments, a cable-fixing harness (not illustrated) is attached to the harness fixing hole 37C, and the power cable 26 is connected to and held by the light bracket 31 by this harness. Note that the power cable 26 may be held by the light bracket 31 by being inserted into the harness fixing hole 37C.

A through hole 37D of a substantially trapezoidal plate shape, in a side view, whose rear edge portion is shorter than its front edge portion is respectively provided in a substantially central portion in the front-rear direction of the left side plate 31L and the right side plate 31R. In one or more embodiments, a concave portion 38 of a substantially trapezoidal plate shape, in a side view, whose rear edge portion is shorter than its front edge portion is also respectively provided in a side face portion, substantially in the center in the front-rear direction, of the left boom 9L and the right boom 9R (see FIG. 6). Having the concave portion 38, the through hole 37D, the left side plate 31L, and the right side plate 31R be shapes substantially analogous to each other unifies the design near the intermediate portion of the boom 9. Moreover, when attaching the bracket 31, attaching by viewing and comparing the shape of the concave portion 38 and the shape of the through hole 37D or by viewing and comparing the shape of the concave portion 38 and the shape of the left side plate 31L and the right side plate 31R also enables accurate attachment of the bracket 31 without confusing a front-rear orientation.

A left-right width dimension (inner dimension) of the gap S1 between the left and right side plates 31L, 31R is set to be substantially identical to a left-right width dimension of the bracket connecting portion 30C of the light main body 30. The bracket connecting portion 30C is inserted into this gap S1 and interposed from the left and right by the side plates 31L, 31R.

The spacer 32 is a cylindrical body extending up and down and is fitted around a bolt shaft 33S of the bracket fixing bolt 33. The spacer 32 is disposed in a position, between the boom lower edge portion 9U and the top plate 31T of the light bracket 31, wherein an axis passing through a center of a hollow portion 32D of the spacer 32 becomes coaxial with the shaft insertion hole 37A of the top plate 31T.

The bracket fixing bolt 33 has a substantially circular bolt head 33H and the bolt shaft 33S, which has a smaller diameter than the bolt head 33H. An engaging protrusion portion 33P of a substantially square shape in a bottom view is provided in a lower face portion of the bolt head 33H. The bolt shaft 33S is formed longer than an up-down length of the spacer 32 fitted around an outer periphery thereof and protrudes downward beyond a lower end of the spacer 32. The engaging protrusion portion 33P is formed to have substantially the same width as the diameter of the bolt shaft 33S. The bracket fixing bolt 33 is connected to and held by a bolt attachment hole 39 provided in the boom lower edge portion 9U. Specifically, the bolt attachment hole 39 has a circular hole 39A, which has a greater diameter than the bolt head 33H, and a long hole 39B extending forward from a rim portion of the circular hole 39A. The long hole 39B is formed to have substantially the same width as the engaging protrusion portion 33P. When attaching the bracket fixing bolt 33 to the bolt attachment hole 39, the bolt head 33H is inserted into the circular hole 39A from below. Afterward, the bolt is slid forward along the long hole 39B. This engages the bolt head 33H to a side edge portion of the long hole 39B from above and fits the engaging protrusion portion 33P into the long hole 39B. As a result, the bracket fixing bolt 33 is connected to and held by the boom lower edge portion 9U in a state wherein rotation is prevented.

The spacer 32 is fitted, from below, around the bolt shaft 33S of the bracket fixing bolt 33 connected to the boom lower edge portion 9U as above. The light bracket 31 is, from below, screwed onto and connected to the bolt shaft 33S protruding downward from the hollow portion 32D of the spacer 32. The bracket fixing nut 34 is, from below, screwed onto and connected to the bolt shaft 33S protruding downward from the shaft insertion hole 37A of the light bracket 31. As illustrated in FIG. 7, this defines, between mutually opposing faces of the boom 9 and the light bracket 31, the gap S2 wherein to cables and the like disposed along the boom 9 can be inserted. Specifically, the light bracket 31 is fixed to the boom lower edge portion 9U in a state wherein the predetermined gap S2 is present between mutually opposing faces of the top plate 31T and the boom lower edge portion 9U, and cables and the like, such as the hydraulic hose 25 and the power cable 26, disposed along the boom lower edge portion 9U extend to a vehicle-body 2 side through this gap S2. In this manner, using the spacer 32 to form a certain gap S2 between the light bracket 31 and the lower edge portion 9U of the boom 9 and passing the hydraulic hose 25 through this gap S2 can prevent the hydraulic hose 25 from being compressed between the light bracket 31 and the lower edge portion 9U of the boom 9 and preventing circulation of hydraulic fluid.

The light fixing bolt 35 has a bolt head 35H and a bolt shaft 35S. The bolt shaft 35S is inserted, from an outer side, into the shaft insertion hole 37B provided in the side plates 31L, 31R of the light bracket 31. The bracket connecting portion 30C of the light main body 30 is inserted into the gap S2 between the side plates 31L, 31R from below the light bracket 31, in a position wherein the bearing hole 30D becomes coaxial with the shaft insertion hole 37B of the side plates 31L, 31R. Therefore, the bolt shaft 35S is inserted into the bearing hole 30D of the bracket connecting portion 30C through the shaft insertion hole 37B. The light fixing nut 36 is, from the side, screwed onto and connected to the bolt shaft 35S protruding to an outer side from one shaft insertion hole 37B. This supports the light main body 30 so as to be able to swing forward and rearward, relative to the light bracket 31, around the bolt shaft 35S. Moreover, increasing a tightening force of the light fixing nut 36 to the bracket fixing bolt 33 causes the bracket connecting portion 30C to be strongly interposed in the left-right direction by the left and right side plates 31L, 31R. As a result, the light main body 30 is fixed at a predetermined angle relative to the light bracket 31. In this manner, an illumination direction of the loader light 22 can be adjusted in a front-rear direction of the bucket 10 by freely changing the angle of the light main body 30. That is, the loader light 22 is provided so its illumination direction can be adjusted to in front of and behind the bucket (work tool) 10.

<Operation Apparatuses>

The steering wheel 16 is a steering apparatus that is provided in the driver's-seat portion 7S and is for controlling a travel direction of the work vehicle 1. As illustrated in FIG. 4, the steering wheel 16 is rotatably connected to and supported by a steering column 19 provided in front of the seat 14; rotating the steering wheel 16 left and right adjusts a steering angle of the front wheel 3F.

The multifunctional operation lever 17 and the loader operation lever 18 are disposed in a position that is on one lateral side (right side) of the seat 14 provided on the vehicle body 2 of the work vehicle 1 and that enables the driver seated in the seat 14 to grip and operate grips 41, 43 using the hand on this one lateral side (right hand). Specifically, the multifunctional operation lever 17 is connected, so as to be able to swing forward and rearward, to a pedestal 27 provided in a front-end upper portion of the armrest 15. The loader operation lever 18 is connected, so as to be able to swing forward and rearward, to a pedestal 28 provided on a front-end right side of the armrest 15. This enables the driver to operate the multifunctional operation lever 17 and the loader operation lever 18 in a posture wherein the right arm is on the armrest 15. As a result, driver fatigue during driving is reduced. Note that in one or more embodiments, a work-light switch (not illustrated) for manually turning the work light 21 on and off is provided in at least any one location or a plurality of locations among the steering column 19, the armrest 15, the multifunctional operation lever 17, and the loader operation lever 18.

The multifunctional operation lever 17 is an operation apparatus (first operation apparatus) that is provided in the driver's-seat portion 7S of the work vehicle 1 and is for operating the vehicle body 2. The multifunctional operation lever 17 is provided with the grip 41, which serves as a grip portion for the driver; a lever shaft (not illustrated) that supports the grip 41; and a plurality of operation switches 42. The lever shaft of the multifunctional operation lever 17 extends into the pedestal 27. The lever shaft of the multifunctional operation lever 17 is erected so as to be able to swing forward and rearward in the pedestal 27. The gearbox equipped to the vehicle body 2 is configured to shift gears based on an operation signal of when this lever shaft is swung forward or rearward.

Figure 9:
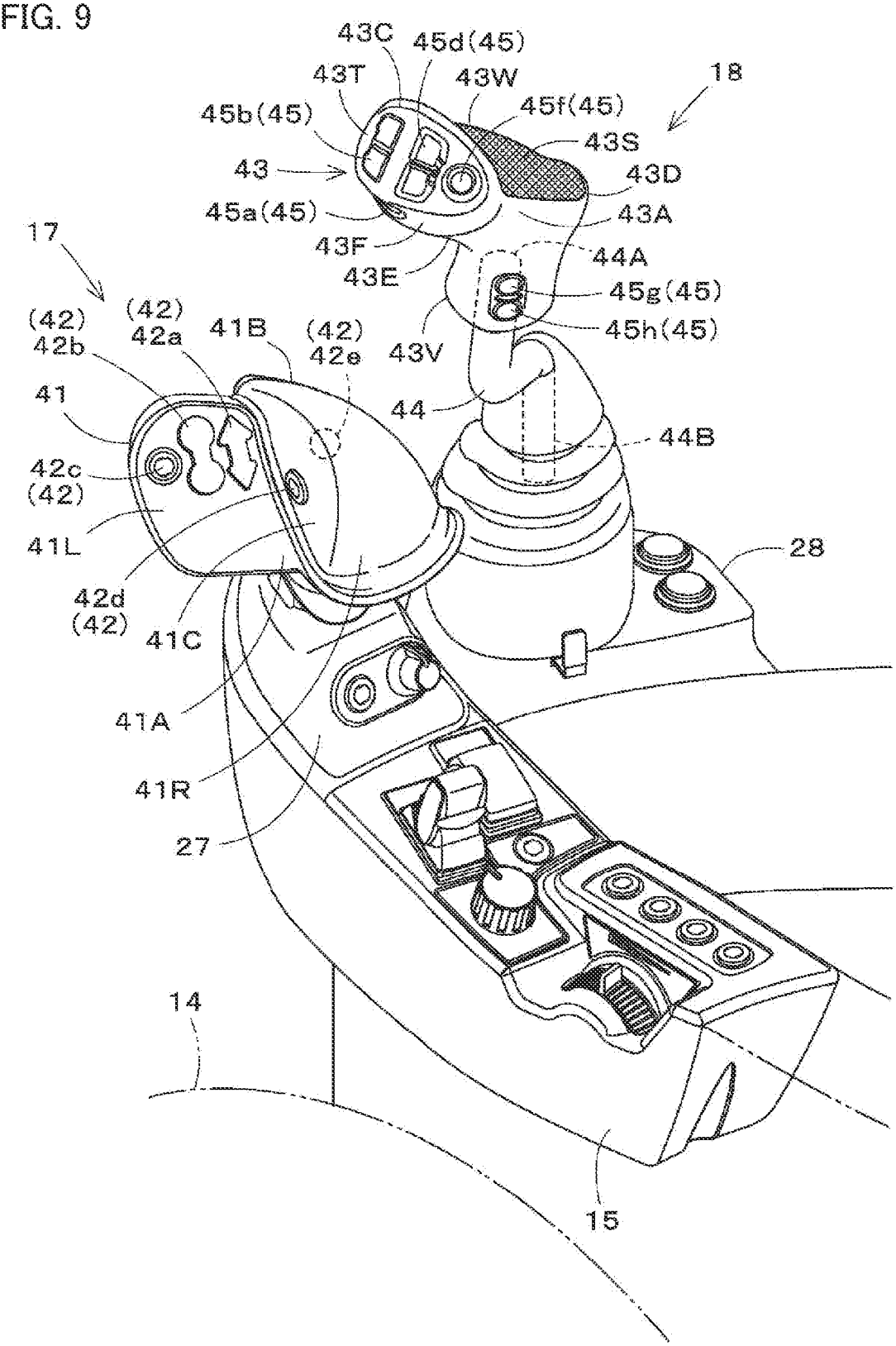
FIG. 9 is a rear perspective view of a periphery of a loader operation lever.
Figure 10:
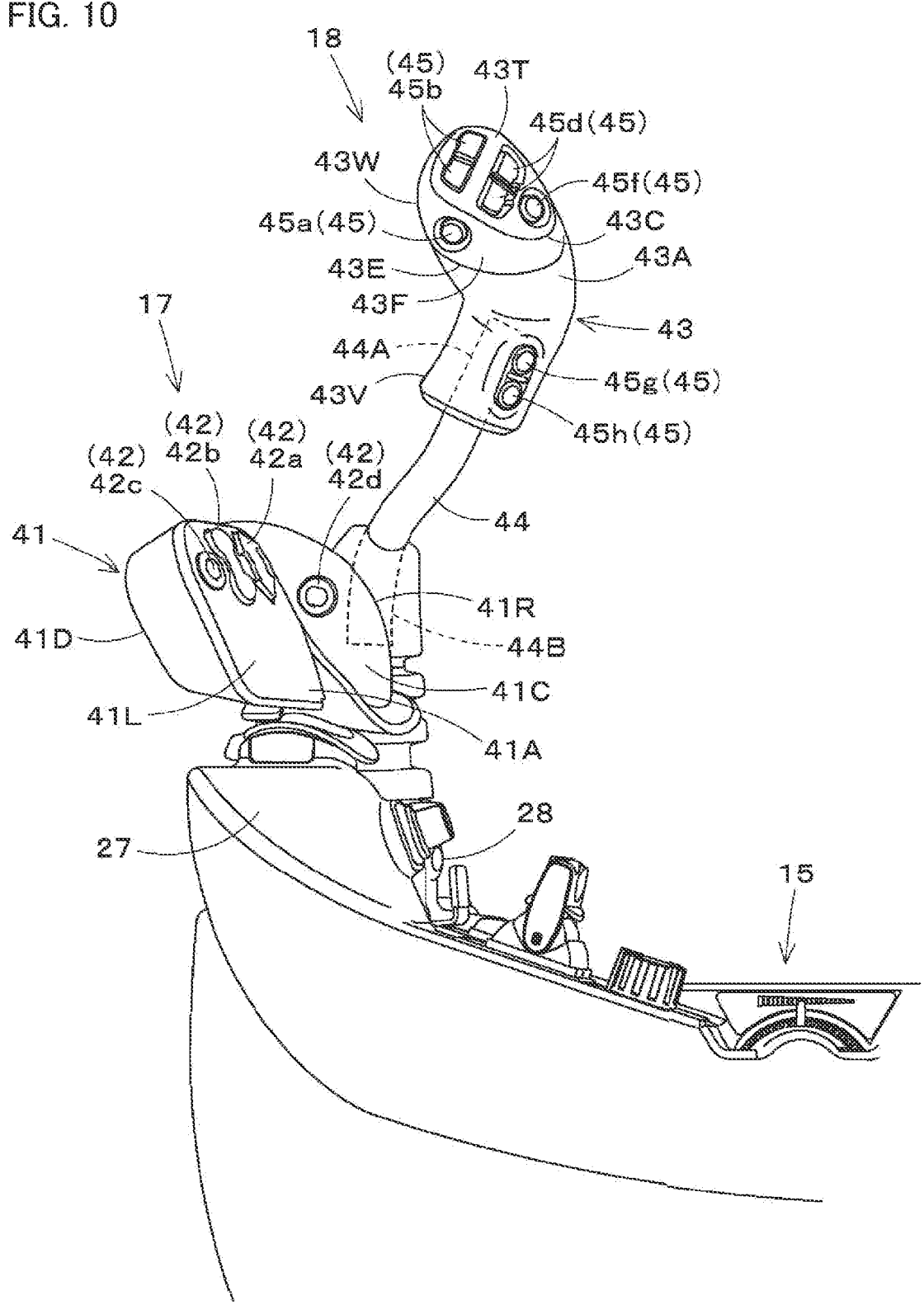
FIG. 10 is a side view of the periphery of the loader operation lever.
Figure 11:
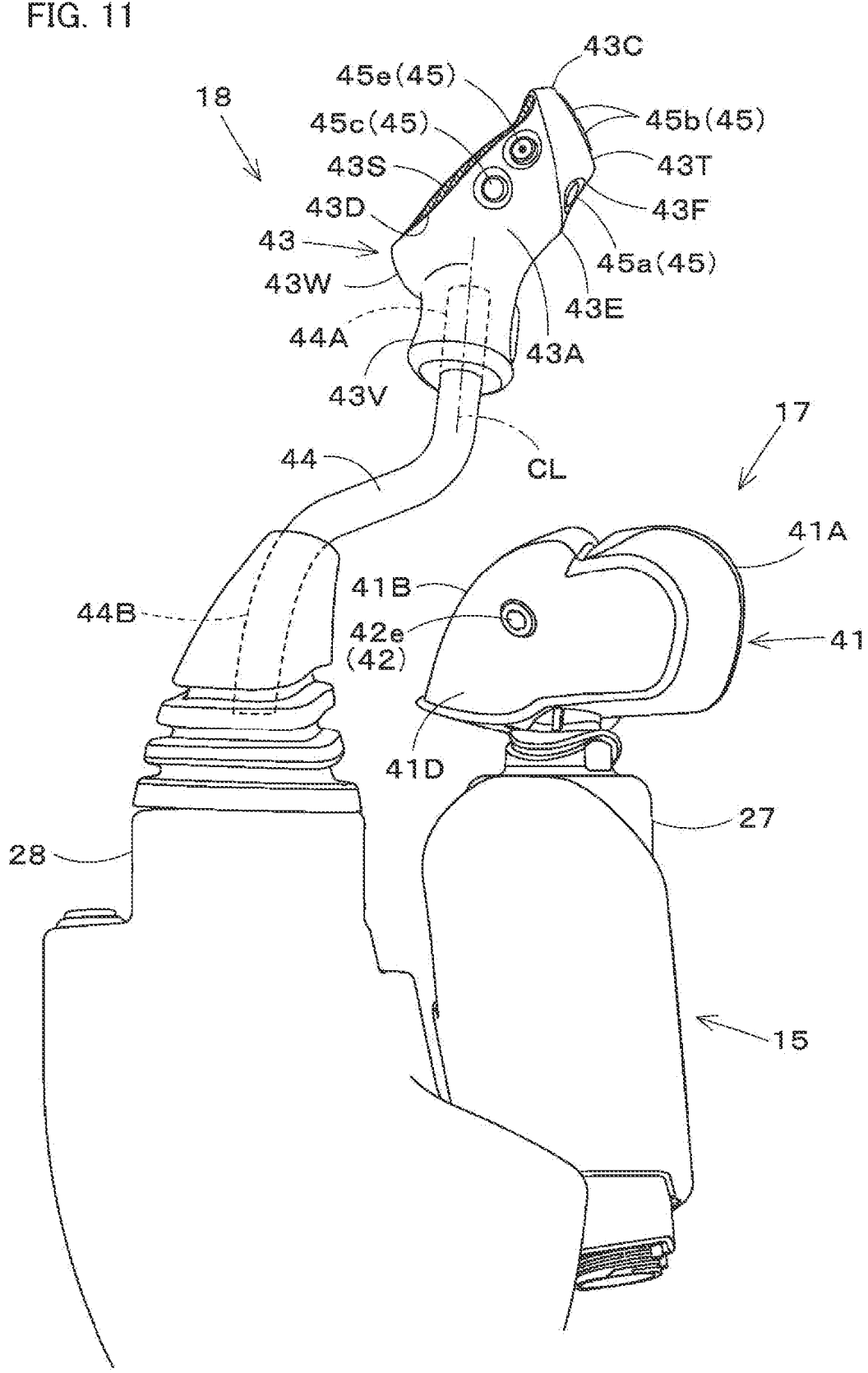
FIG. 11 is a front view of the periphery of the loader operation lever.

The grip 41 of the multifunctional operation lever 17 is provided in an upper extended portion of the lever shaft that is not illustrated. As illustrated in FIG. 9 to FIG. 11, the grip 41 is formed in an irregular block shape whose left-right width dimension is greater than its front-rear width dimension, and the grip is provided in a distal end portion of the lever shaft that is not illustrated. A surface portion (grip surface portion) 41A of the grip 41 is inclined downward from a right front portion to a left rear portion so as to face the driver seated in the seat 14. The grip surface portion 41A is provided with a gripping portion 41R and an operation panel portion 41L. The operation panel portion 41L is formed to be substantially flat and is provided on a left side (seat 14 side) of a substantially central portion, in terms of left and right, of the grip surface portion 41A. The gripping portion 41R is formed protruding in a shape that is substantially a circular-arc convex face and is provided on a right side (opposite side of seat 14 side) of the substantially central portion, in terms of left and right, of the grip surface portion 41A. An edge portion (gripping-portion front edge portion) 41B from a front portion to a right side portion of the gripping portion 41R is formed to have a substantially circular arc shape in a top view. A side face portion (gripping-portion side face portion) 41C on an operation-panel-portion 41L side of the gripping portion 41R is formed so as to be raised along a right-side side of the operation panel portion 41L. In one or more embodiments, a state wherein the palm is placed on the gripping portion 41R, the thumb is along the gripping-portion side face portion 41C, and the four fingers other than the thumb are placed over the gripping-portion front edge portion 41B so the grip 41 is gripped in a horizontally diagonal manner from the front-right is the basic gripping mode of when the multifunctional operation lever 17 is being operated.

The operation switches 42 are operation switches that are provided on the grip 41 and are for causing the vehicle body 2 to execute various operations. A plurality of operation switches 42 is provided on the operation panel portion 41L of the grip 41. An operation switch 42 is also respectively provided on the gripping-portion side face portion 41C of the grip 41 and a rear face portion (grip rear face portion) 41D of the grip 41.

The operation switches 42 provided on the operation panel portion 41L include a shuttle switching switch (first shuttle switching switch) 42a for manually switching between moving the work vehicle 1 forward and rearward, a pumper switch 42b for manually raising and lowering the work tool mounted to the raising and lowering apparatus (not illustrated) in the rear portion of the vehicle body 2, and an automatic shifting switching switch 42c for manually switching between an auto shifting mode and a manual shifting mode in automatic shifting. Note that in the auto shifting mode, electronic control is used to automatically select an optimal gear within a range of gears preset by the driver. In the manual shifting mode, the driver can manually switch gears.

The operation switch 42 provided on the gripping-portion side face portion 42B is a shifting auxiliary switch 42d for manually switching a shifting unit of the gearbox. In one or more embodiments, the gearbox has a main shifting unit that uses appropriate hydraulic control to suppress impact during shifting and a supplementary shifting unit of a normal synchromesh type. Swinging the multifunctional operation lever 17 forward and rearward while pressing the shifting auxiliary switch 42d enables shifting to be performed that is accompanied by switching in the supplementary shifting unit. Meanwhile, swinging the multifunctional operation lever 17 forward and rearward without pressing the shifting auxiliary switch 42d enables shifting of only the main shifting unit to be performed that is not accompanied by switching in the supplementary shifting unit.

The operation switch 42 provided on the grip rear face portion 41D is a shuttle restraint switch (first shuttle restraint switch) 42e for manually restraining the switching operation by the shuttle switching switch 42a and manually releasing this restraint. In one or more embodiments, pressing the shuttle switching switch 42a while pressing the shuttle restraint switch 42e switches between forward and reverse movement of the work vehicle 1. Therefore, forward and reverse movement of the work vehicle 1 is not switched even if the shuttle switching switch 42a is pressed without pressing the shuttle restraint switch 42e.

The shuttle switching switch 42a, the pumper switch 42b, the automatic shifting switching switch 42c, and the shifting auxiliary switch 42d are provided on the surface portion (grip surface portion) 41A of the grip 41. The shuttle restraint switch 42e is provided on the rear face portion (grip rear face portion) 41D of the grip 41.

The shuttle switching switch 42a is a rocker switch and is provided, so as to be able swing forward and rearward, in a position on a right side (gripping-portion 41R side) of a center, in terms of left and right, on an upper half face of the operation panel portion 41L. The pumper switch 42b is a rocker switch and is provided, so as to be able to swing forward and rearward, in a substantially central portion, in terms of left and right, on the upper half face of the operation panel portion 41L. The automatic shifting switching switch 42c is a push switch and is provided in a position on a left side (opposite side of gripping portion 41R) of the center, in terms of left and right, on the upper half face of the operation panel portion 41L. The upper half face of the operation panel portion 41L is in a position sufficiently reached by the tip of the thumb when the grip 41 is gripped in the basic gripping mode. That is, the shuttle switching switch 42a, the pumper switch 42b, and the automatic shifting switching switch 42c are provided in positions where they can be operated by the thumb of the hand gripping the grip 41 (gripping portion 41R). Therefore, the shuttle switching switch 42a, the pumper switch 42b, and the automatic shifting switching switch 42c can each be appropriately operated by the thumb while gripping the grip 41.

The shifting auxiliary switch 42d is a push switch and is provided in a substantially central portion, in terms of front and rear, on the gripping-portion side face portion 42B. In one or more embodiments, the central portion, in terms of front and rear, of the gripping-portion side face portion 42B is the portion most easily contacted by the tip of the thumb when gripping the grip 41 in the basic gripping mode. That is, the shifting auxiliary switch 42d is provided in a position where it can be operated by the thumb of the hand gripping the grip 41 (gripping portion 41R). Therefore, the shifting auxiliary switch 42d can be appropriately operated by the thumb while gripping the grip 41.

The shuttle restraint switch 42e is a push switch and is provided in a position, on the grip rear face portion 41D, that is toward a front end of the gripping-portion front edge portion 41B. That is, the shuttle restraint switch 42e is provided in a position where it can be operated by the tip of a finger other than the thumb (index finger or middle finger) of the hand gripping the grip 41 (gripping portion 41R). Therefore, the shuttle restraint switch 42e can be appropriately operated by the index finger or the middle finger while gripping the grip 41.

The loader operation lever 18 is an operation apparatus (second operation apparatus) that is provided in the driver's-seat portion 7S of the work vehicle 1 and is for operating the front loader 4 mounted to the vehicle body 2 of the work vehicle 1. That is, the loader operation lever 18 is an operation lever for manually operating the boom 9. The loader operation lever 18 is provided with the grip 43, which serves as a grip portion for the driver; a lever shaft 44 that supports the grip 43; and a plurality of operation switches 45. The lever shaft 44 of the loader operation lever 18 extends into the driver's-seat portion 7S. The lever shaft 44 is supported so as to be able to swing forward and rearward in the pedestal 28. In one or more embodiments, the lever shaft 44 is a substantially S-shaped tube body that extends upward from inside the pedestal 28, extends in a substantially horizontal manner to the seat 14 side midway, and is formed extending further upward. An upper extended portion (distal end portion) 44A of the lever shaft 44 is inserted into and fixed in the grip 43 of the loader operation lever 18. A lower extended portion 44B of the lever shaft 44 is connected to and supported by a link mechanism portion inside the pedestal 28. The boom 9 of the front loader 4 is configured to move up and down based on an operation signal of when the lever shaft 44 is swung forward or rearward.

As illustrated in FIG. 10 and FIG. 11, the grip 43 of the loader operation lever 18 is provided in a position above the grip 41 of the multifunctional operation lever 17. Moreover, as illustrated in FIG. 4, the grip 43 of the loader operation lever 18 is provided in a position to the rear of the grip 41 of the multifunctional operation lever 17. That is, the grip 43 of the loader operation lever 18 and the grip 41 of the multifunctional operation lever 17 are disposed lined up in the front-rear direction.

The grip 43 of the loader operation lever 18 is provided on the upper extended portion 44A of the lever shaft 44. As illustrated in FIG. 9 to FIG. 11, the grip 43 is formed in a shape that is substantially an inverted L extending leftward and upward in the driver's-seat portion 7S. Specifically, the grip 43 has a proximal end portion (grip proximal end portion) 43V, which has a shape that is substantially a vertically long column extending upward from the upper extended portion 44A of the lever shaft 44, and a horizontal extended portion (grip horizontal extended portion) 43W, which has a shape that is substantially a horizontally long column extending from an upper end of the grip proximal end portion 43V to the seat 14 side in the driver's-seat portion 7S. In one or more embodiments, a state wherein the palm covers substantially an upper half face of an outer peripheral face portion (grip outer peripheral face) 43A of the grip horizontal extended portion 43W and the grip horizontal extended portion 43W is gripped horizontally from above so the thumb and the other four fingers are along substantially a lower half face of the grip outer peripheral face 43A is the basic gripping mode of when the loader operation lever 18 is being operated. As illustrated in FIG. 11, the grip horizontal extended portion 43W is inclined, relative to an axis CL passing through a center of the upper extended portion 44A of the lever shaft 44, to the left (seat 14 side) at a predetermined angle, at an angle of being oriented upward from a horizontal direction. That is, the grip horizontal extended portion 43W of the loader operation lever 18 is inclined so as to head upward as this portion extends from an upper position of the upper extended portion (distal end portion) 44A of the lever shaft 44 (upper end of grip proximal end portion 43V) to the seat 14 side in the driver's-seat portion 7S. This enables the driver to grip the grip 43 in a natural posture wherein the wrist is turned slightly outward (to the right) in the horizontal direction.

As illustrated in FIG. 9 and FIG. 11, in the grip outer peripheral face 43A, a right end portion of substantially an upper half face (grip upper face) 43S thereof is formed having a shape that is substantially a circular-arc concave face so the right end portion is constricted toward a center, and a central portion is formed having a shape that is substantially a circular-arc convex face so the central portion expands to an outer peripheral side. That is, the grip outer peripheral face 43A is formed in a streamlined shape wherein the grip upper face 43S serving as a face whereon the palm is placed is gently recessed in heading left from the right end portion, changes to a gently protruding face and expands in the central portion, and is again gently recessed in heading further left and reaching a left end portion. As such, when the grip 43 is gripped, a vicinity of the hypothenar eminence of the hand is abutted along the right concave face portion of the grip upper face 43S and is engaged from the left to the right end portion of the grip upper face 43S. Moreover, a vicinity of a base portion of the index finger is abutted along the left concave face portion of the grip upper face 43S and is engaged from the right to the left end portion of the grip upper face 43S. As a result, the hand is less likely to slip left and right (extending direction of grip horizontal extended portion 43W), and the loader operation lever 18 can be operated reliably. Moreover, hand fatigue is also reduced because there is no need to firmly grip the grip 43 during operation.

The grip outer peripheral face 43A is provided with an anti-slip portion 43D. In one or more embodiments, the anti-slip portion 43D is provided over substantially an entire face of the substantially upper half face (grip upper face) 43S of the grip outer peripheral face 43A contacted by the palm when the grip 43 is gripped and is not provided on the substantially lower half face of the grip outer peripheral face 43A contacted by the fingertips. The anti-slip portion 43D is formed of a material having an anti-slip function such as rubber and generates, between itself and the palm gripping the grip horizontal extended portion 43W, a greater frictional force than the substantially lower half face of the grip outer peripheral face 43A not provided with the anti-slip portion 43D. As such, the hand gripping the grip 43 is less likely to slip in an extending direction and circumferential direction thereof, and the loader operation lever 18 can be operated reliably. Moreover, movement of the fingers is not obstructed by the anti-slip portion 43D when operating operation switches 45 provided on the grip 43.

A plurality of concavities and convexities is formed on a surface of the anti-slip portion 43D. In one or more embodiments, these concavities and convexities are formed as a plurality of intersecting grooves extending diagonally in a circumferential direction at predetermined intervals. This can further prevent the hand gripping the grip 43 from slipping in the extending direction and circumferential direction thereof. The anti-slip portion 43D is configured by, for example, affixing or embedding a member formed by a material having an anti-slip function to or into the grip outer peripheral face 43A. Note that the anti-slip portion 43D may be formed of the same material as the grip outer peripheral face 43A or be absent of concavities and convexities on its surface as long as slipping of the hand gripping the grip 43 can be sufficiently suppressed. Moreover, it may be integrally formed with the grip outer peripheral face 43A instead of being separate from the grip outer peripheral face 43A. Moreover, the concavities and convexities are not limited to intersecting grooves and may be another shape such as a wave shape, a plurality of parallel ribs, dimples, small protrusions, irregular undulations, or a combination thereof.

As illustrated in FIG. 9 to FIG. 11, the grip outer peripheral face 43A is provided with a protruding portion 43E. Specifically, a protruding portion 43E that can engage and hold the thumb of the hand gripping the grip 43 is provided in a position more toward a distal end (grip distal end face) 43T than an intermediate position, in the extending direction of the grip horizontal extended portion 43W, of the outer peripheral face portion (grip outer peripheral face) 43A of the grip horizontal extended portion 43W. The protruding portion 43E is formed to be peak-shaped in a vertical sectional view and extends in the circumferential direction along the grip outer peripheral face 43A. The protruding portion 43E is disposed at the right of and adjacent to an outer rim portion (grip distal end edge portion) 43C of the grip distal end face 43T. In one or more embodiments, the protruding portion 43E extends over substantially an entire circumference of the grip outer peripheral face 43A. Therefore, when the grip horizontal extended portion 43W is gripped, the thumb and the index finger of the hand readily contact the protruding portion 43E. This enables the driver to easily understand positions of operation switches 45 provided on the grip outer peripheral face 43A by touch alone using the thumb and the index finger, without viewing the grip 43. Moreover, while gripping the grip 43, an area from a vicinity of the base of the thumb (thenar eminence) to the fingertip can be placed over an upper portion of the protruding portion 43E. As a result, hand fatigue is further reduced.

A face (finger placing face) 43F between the protruding portion 43E and the grip distal end edge portion 43C in a lower left portion of the grip outer peripheral face 43A is formed in a shape that is substantially a circular-arc concave face. Therefore, the tip of the thumb placed over the protruding portion 43E is supported on the finger placing face 43F. This makes hand fatigue less likely for the driver even if the thumb is placed over the protruding portion 43E for a long time.

The distal end face portion (grip distal end face) 43T of the grip horizontal extended portion 43W is inclined from a front edge side, which is a distal side of the hand gripping the grip horizontal extended portion 43W, to a rear edge side on an opposite side. Specifically, the grip distal end face 43T is inclined from the front-left to the rear-right so as to face the driver seated in the seat 14. This enables the driver to use the tip of the thumb to easily operate operation switches 45 provided on the grip distal end face 43T.

The operation switches 45 are operation switches that are provided on the grip 43 and are for causing the work vehicle 1 (vehicle body 2 and front loader 4) to execute various operations. The grip distal end face 43T, the grip outer peripheral face 43A, and the grip proximal end portion 43V are each provided with a plurality of operation switches 45.

The operation switches 45 provided on the grip distal end face 43T include a third function switch 45*b* as a work-tool operation switch that can be assigned an operation function of the work tool (such as the bucket 10) of the front loader 4, a shifting switch 45*d* for manually shifting gears in the gearbox, and a loader light switch (illumination switch) 45*f* for manually turning the loader light (second illumination lamp) 22 on and off. The third function switch 45*b* is a switch that can be assigned an operation function of a work tool mounted instead of or in addition to the bucket 10 of the front loader 4.

The operation switches 45 disposed on the grip outer peripheral face 43A include a shuttle switching switch (second shuttle switching switch) 45*a* for manually switching between forward and reverse movement of the work vehicle 1, a fourth function switch 45*c* as a work-tool operation switch that can be assigned an operation function of the work tool (such as the bucket 10) of the front loader 4, and a shuttle restraint switch (second shuttle restraint switch) 45*e* for manually restraining the switching operation by the shuttle switching switch 45*a* and manually releasing this restraint. The fourth function switch 45*c* is a switch that can be assigned an operation function of a work tool mounted instead of or in addition to the bucket 10 of the front loader 4.

The operation switches 45 provided on the grip proximal end portion 43V include a first option switch 45*g* and second option switch 45*h* that can be assigned predetermined functions of the front loader 4.

Among the operation switches 45, the third function switch 45*b*, the shifting switch 45*d*, and the loader light switch 45*f* are provided on the distal end face portion (grip distal end face) 43T of the grip 43. Note that the loader light switch 45*f* may be provided on the grip proximal end portion 43V. Moreover, the operation function for manually turning the loader light (second illumination lamp) 22 on and off may be assigned to the first option switch 45*g* or the second option switch 45*h* instead of the loader light switch 45*f*.

The third function switch 45*b* is a push switch and is provided lined up as an upper and lower pair in a frontward and leftward position on the grip distal end face 43T. The shifting switch 45*d* is a push switch and is provided lined up as an upper and lower pair in a substantially central position, in terms of left and right, on the grip distal end face 43T. The loader light switch 45*f* is a push switch and is provided in a rearward and rightward position on the grip distal end face 43T.

In one or more embodiments, the grip distal end face 43T is in a position sufficiently reached by the tip of the thumb when the grip horizontal extended portion 43W is gripped in the basic gripping mode. That is, the third function switch 45b, the shifting switch 45d, and the loader light switch 45f are provided in positions where they can be operated by the thumb of the hand gripping the grip horizontal extended portion 43W. Therefore, the third function switch 45b, the shifting switch 45d, and the loader light switch 45f can each be appropriately operated by the thumb while gripping the grip 43. Note that the third function switch 45b disposed on the grip distal end face 43T is a switch having a higher usage frequency than the other operation switches 45 when working using the front loader 4.

Among the operation switches 45, the shuttle switching switch 45a, the fourth function switch 45c, and the shuttle restraint switch 45e are provided on the outer peripheral face portion (grip outer peripheral face) 43A of the grip 43.

The shuttle switching switch 45a is a push switch and is provided in a position toward a lower-portion left end (distal end) of the grip outer peripheral face 43A. In one or more embodiments, the shuttle switching switch 45a is provided on the finger placing face 43F of the grip outer peripheral face 43A. Moreover, the shuttle switching switch 45a is disposed below and adjacent to the third function switch (work-tool operation switch) 45b. The fourth function switch 45c and the shuttle restraint switch 45e are each a push switch and are disposed lined up horizontally, left and right, in a position toward a front-portion left end (distal end) of the grip outer peripheral face 43A. The shuttle restraint switch 45e is provided on a left side (distal-end side) of the fourth function switch 45c. Note that although only the shuttle switching switch 45a is provided on the finger placing face 43F in one or more embodiments, as necessary, any of the above operation switches 45 or an operation switch 45 having another function may be provided thereon.

In one or more embodiments, the lower left portion (finger placing face 43F) of the grip outer peripheral face 43A is the portion most easily contacted by the tip of the thumb when gripping the grip horizontal extended portion 43W in the basic gripping mode. That is, the shuttle switching switch 45a is provided in a position where it can be operated by the thumb of the hand gripping the grip horizontal extended portion 43W. Therefore, the shuttle switching switch 45a can be speedily and appropriately operated by the thumb while gripping the grip 43. Moreover, a left front portion of the grip outer peripheral face 43A (left front position of front edge portion of anti-slip portion 43D) is the portion most easily contacted by the tips of the index finger and the middle finger when gripping the grip horizontal extended portion 43W in the basic gripping mode. That is, the fourth function switch 45c and the shuttle restraint switch 45e are provided in positions where they can be operated by the tip of a finger other than the thumb (index finger or middle finger) of the hand gripping the grip horizontal extended portion 43W. Therefore, the fourth function switch 45c and the shuttle restraint switch 45e can be speedily and appropriately operated by the index finger or the middle finger while gripping the grip 43. Moreover, a substantially hemispherical protrusion is formed in a central portion of an operation face portion 48 of the shuttle restraint switch 45e. This enables the driver to easily understand the position of the shuttle restraint switch 45e by touch alone using the index finger or middle finger, without viewing the grip 43. Note that the shuttle switching switch 45a and the fourth function switch 45c disposed on the grip outer peripheral face 43A are switches having a higher usage frequency than the other operation switches 45 when working using the front loader 4.

Among the operation switches 45, the first option switch 45g and the second option switch 45h are provided on the grip proximal end portion 43V.

The first operation switch 45g and the second operation switch 45h are each a push switch and are disposed lined up vertically, up and down, on a rear face of the grip proximal end portion 43V. In one or more embodiments, the rear face of the grip proximal end portion 43V is in a position sufficiently reached by the tip of the thumb by lowering the thumb from the state wherein the grip horizontal extended portion 43W is being gripped in the basic gripping mode. That is, the first option switch 45g and the second option switch 45h are provided in positions where they can be operated by the thumb of the hand placed on the grip horizontal extended portion 43W. Therefore, both the first option switch 45g and the second option switch 45h can be appropriately operated by the thumb while gripping the grip 43.

The shuttle switching switch 45a of the loader operation lever 18 has the same function as the shuttle switching switch 42a provided on the multifunctional operation lever 17, and the shuttle restraint switch 45e of the loader operation lever 18 has the same function as the shuttle restraint switch 42e provided on the multifunctional operation lever 17. Therefore, using the thumb to press the shuttle switching switch 45a while using the index finger to press the shuttle restraint switch 45e in a state of gripping the loader operation lever 18 can switch between forward and reverse movement of the work vehicle 1.

Figure 12A:
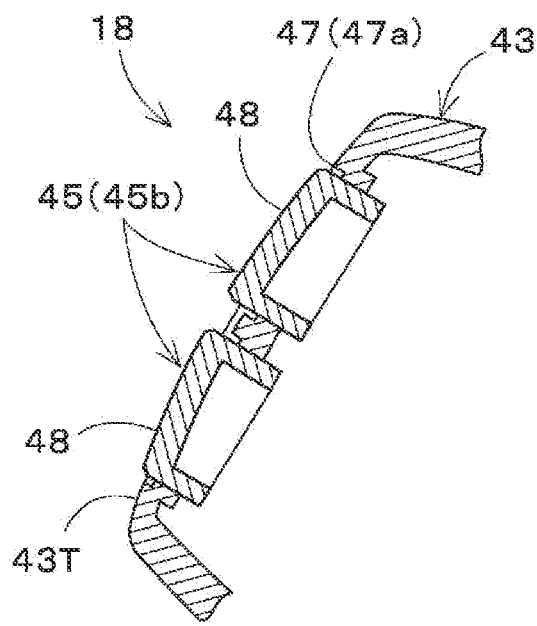
FIGS. 12A-12B are each a schematic vertical sectional view of a periphery of first and second operation switches of the loader operation lever.
Figure 12B:
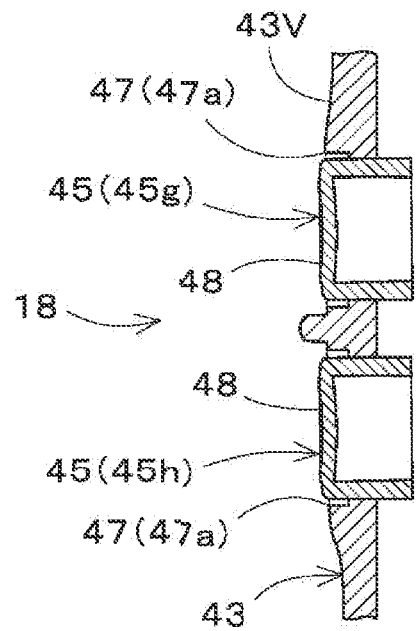

As illustrated in FIGS. 12A-12B and FIGS. 13A-13B, the grip 43 of the loader operation lever 18 is provided with a concave portion 47 that is recessed inward from a surface portion. Specifically, the concave portion 47 is provided in attachment portions of each operation switch 45 on the grip distal end face 43T, the grip outer peripheral face 43A, and the grip proximal end portion 43V. As illustrated in FIGS. 12A-12B, a concave portion 47a provided in the respective attachment portions of the third function switch 45b, the first option switch 45g, and the second option switch 45h among the operation switches 45 is formed having a substantially E-shaped cross section. The third function switch 45b is provided in the concave portion 47a in a state wherein the operation face portion 48 is protruding outward from the grip distal end face 43T. Moreover, the first operation switch 45g and the second option switch 45h are provided in the concave portion 47a in a state wherein the operation face portion 48 is protruding to a surface outer side of the grip proximal end portion 43V.

Figure 13A:
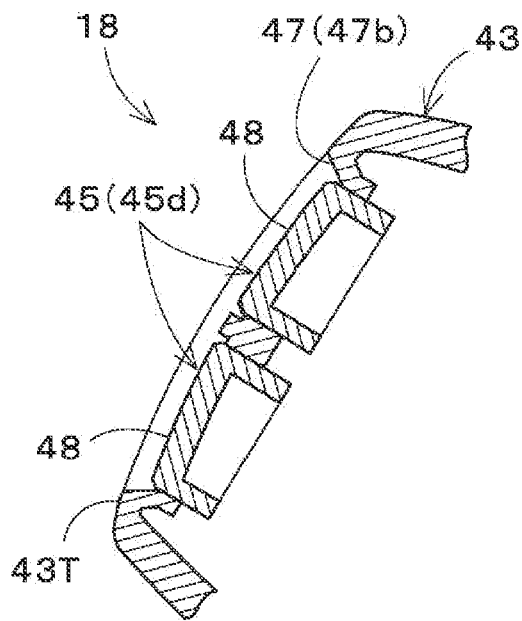
FIGS. 13A-13B are each a schematic vertical sectional view of a periphery of third and fourth operation switches of the loader operation lever.
Figure 13B:
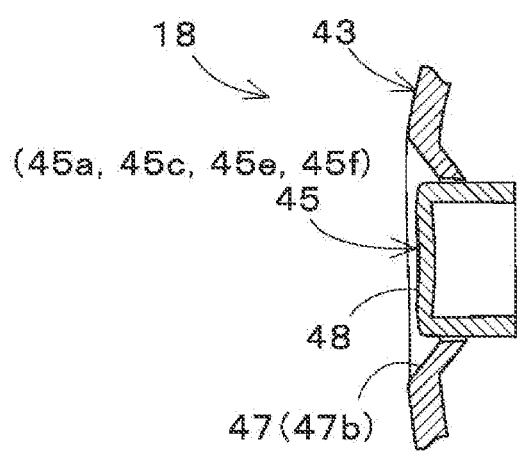

Meanwhile, as illustrated in FIGS. 13A-13B, a concave portion 47b provided in the respective attachment portions of the shifting switch 45d, the shuttle switching switch 45a, the fourth function switch 45c, the shuttle restraint switch 45e, and the loader light switch 45f among the operation switches 45 is formed to be substantially bowl-shaped. The shifting switch 45d is provided in the concave portion 47b so the operation face portion 48 does not protrude to an outer side of the grip distal end face 43T. Moreover, the shuttle switching switch 45a, the fourth function switch 45c, the shuttle restraint switch 45e, and the loader light switch 45f are similarly provided in the concave portion 47b so the operation face portion 48 does not protrude to a surface outer side of the grip 43. Therefore, when the grip 43 is gripped, the fingers do not inadvertently contact these operation switches 45. This can prevent erroneous operation of the vehicle body 2 and the front loader 4. This can also prevent the operation switches 45 from impairing an operational feel of when the loader operation lever 18 is operated.

<Control Device>

Figure 14:
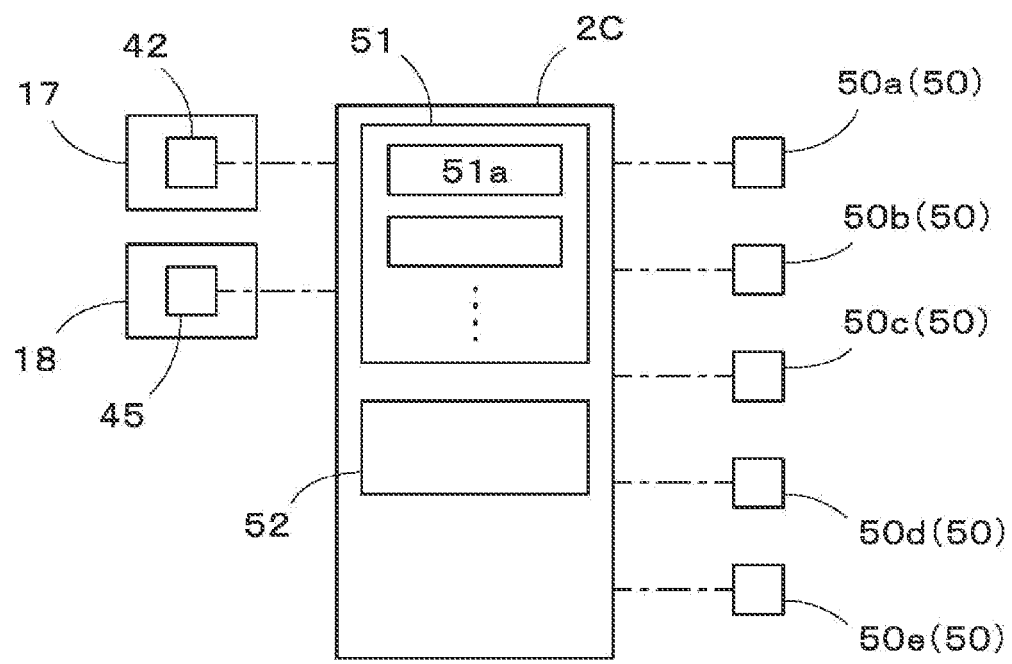
FIG. 14 is a schematic configuration view of a control device.

As illustrated in FIG. 14, a plurality of detection devices 50, which is provided in various locations of the work vehicle 1 and detects various states, and operation-apparatus switches and the like are connected to the control device 2C. The detection devices 50 are, for example, an engine speed sensor 50a that detects the engine speed, a vehicle speed sensor 50b that detects a travel speed of the work vehicle 1, an acceleration-pedal sensor 50c that detects an accelerator operation amount, a steering angle sensor 50d that detects a steering angle of the steering wheel 16, and a boom position sensor 50e that detects an elongation amount of the boom cylinder 11. The boom position sensor 50e functions as a boom position detector that detects a position of the boom 9. The operation-apparatus switches and the like are, for example, the operation switches 42 of the multifunctional operation lever 17 and the operation switches 45 of the loader operation lever 18. However, the detection devices 50 and the operation switches 42, 45 are one example, and are not limited to the above sensors and switches.

Furthermore, the control device 2C is provided with an operation control unit 51, which controls the operations of the work vehicle 1 and the front loader 4 based on signals from the detection devices 50 and the operation switches 42, 45, and a storage unit 52, which stores various programs and data tables relating to the operations of the work vehicle 1 and the front loader 4. In one or more embodiments, the operation control unit 51 includes an illumination control unit (i.e., illumination controller) 51a that controls illumination operations of the work light (first illumination lamp) 21 and the loader light (second illumination lamp) 22.

The illumination control unit 51a can execute a lighting restriction of automatically turning off or dimming the work light (first illumination lamp) 21 while the loader light (second illumination lamp) 22 is turned on. The illumination control unit 51a controls turning the work light 21 and the loader light 22 on and off based on a signal indicating that the work light 21 is turned on, a signal indicating that the loader light 22 is turned on, a position detection signal output from the boom position sensor 50e, an operation signal output based on an operation of the loader light switch 45f, and the like. That is, the illumination control unit 51a controls turning on the work light 21 and the loader light 22 based on an operation of the loader light switch 45f and the elongation amount of the boom cylinder 11 (boom 9 height position).

In one or more embodiments, the illumination control unit 51a switches between executing and canceling the lighting restriction based on position detection information from the boom position sensor (boom position detector) 50e. Specifically, the illumination control unit 51a calculates an actual elongation amount of the boom cylinder 11 based on the position detection signal output from the boom position sensor 50e and the data tables stored in the storage unit 52 and determines the height position of the boom 9 based on this actual elongation amount. Moreover, the illumination control unit 51a turns on the work light 21 when an on operation of the work-light switch (not illustrated) is detected and turns on the loader light 22 when an on operation of the loader light switch 45f is detected.

Furthermore, the illumination control unit 51a executes the lighting restriction when the boom 9 is raised to a predetermined position or higher. Specifically, the illumination control unit 51a executes a lighting restriction of keeping the work light 21 turned off (or turning this off if this is turned on) when the on operation of the work-light switch (not illustrated) is detected or when, after the work light 21 is turned on, the boom 9 is raised to the predetermined position or higher and the actual elongation amount is at or above a predetermined threshold.

Meanwhile, the illumination control unit 51a cancels the lighting restriction when the boom 9 is below the predetermined position. Specifically, the illumination control unit 51a turns on the work light 21 (or keeps this turned on if this is turned on) when the boom 9 is below the predetermined position and the actual elongation amount is less than the predetermined threshold. That is, the lighting restriction is canceled.

The predetermined position can be set to a position wherein a height of at least a portion of the boom 9 becomes identical to a height of the loader light (first illumination lamp) 21. In one or more embodiments, a position in the boom 9 serving as a reference for switching between the lighting restriction and the restriction cancelation is set as a substantially central upper portion (bent-portion upper edge) 9T in the front-rear direction of the boom 9, and the height position (threshold) of performing the switching is set to a position wherein the bent-portion upper edge 9T is at the same height as the work light 21 (horizontally in front of the work light 21).

Therefore, when, as illustrated in FIG. 2, the bent-portion upper edge 9T of the boom 9 is raised to the height position of the work light 21 or higher, the lighting restriction of the work light 21 is executed, and only the loader light 22 is turned on. This causes the loader light 22 to provide illumination in front of the boom 9—that is, to the periphery of the bucket 10. Meanwhile, when, as illustrated in FIG. 1, the bent-portion upper edge 9T of the boom 9 is below the height position of the work light 21, the lighting restriction of the work light 21 is canceled, and both the work light 21 and the loader light 22 are turned on. This causes the work light 21 and the loader light 22 to illuminate the work area in front of the vehicle body 2 and the periphery of the bucket 10.

<Other Embodiments>

The above embodiments are configured so the work light 21 is turned off when the boom 9 is raised to the predetermined position or higher when the loader light 22 is turned on. However, instead of completely turning off the work light 21, an illuminance of the work light 21 may be lowered (dimmed) to an extent of light reflected by the boom 9 and the connecting frame 9J not compromising visibility of the bucket 10 periphery. That is, in one or more embodiments of the present invention, the illumination control unit 51a can execute a lighting restriction of automatically dimming the work light 21 when the loader light 22 is turned on.

Furthermore, the above embodiments are configured to switch between lighting restriction and restriction cancelation for the work light 21 according to whether the bent-portion upper edge 9T of the boom 9 is raised to the height of the work light 21 or higher. However, the position in the boom 9 serving as the reference for the switching is not limited to the bent-portion upper edge 9T and may be set as, for example, a front edge portion of the boom 9 or an attachment position of the loader light 22 on the boom lower edge portion 9U. Moreover, the height position wherein the switching is performed is not limited to the height of the work light 21 and may be set to a position lower than the height of the work light 21 (for example, an upper-face height position of the bonnet 5) or a position higher than the height of the work light 21 (for example, the top of the movable range of the boom 9). Alternatively, a configuration may be such that a setting operation unit made of an operation switch, an operation dial, or the like is disposed in the steering column 19, the armrest 15, the multifunctional operation lever 17, the loader operation lever 18, or the like and operating this setting operation unit can manually set the height position (threshold) of performing the switching to any height position (threshold). Such a configuration enables the driver to freely adjust a timing of executing the switching between lighting restriction and restriction cancelation for the work light 21 according to an illumination direction and a disposition of the work light 21, a shape of the front loader 4, and the like.

Furthermore, the above embodiments are configured to execute lighting restriction and restriction cancelation for the work light 21 according to the height position of the boom 9. However, the illumination control unit 51a may be made able to execute lighting restriction of automatically turning off or dimming the work light (first illumination lamp) 21 based on an operation of turning on the loader light (second illumination lamp) 22. Specifically, the illumination control unit 51a may be configured so lighting restriction of the work light 21 is executed based on the on operation of the loader light switch 45f (operation of turning on loader light 22) and this lighting restriction is canceled based on an off operation of the loader light switch 45f (operation of turning off loader light 22).

Furthermore, the above embodiments are configured so when the boom 9 is below the predetermined position, lighting restriction of the work light 21 is canceled and both the work light 21 and the loader light 22 are turned on. However, the lighting restriction of the work light 21 may be canceled and lighting restriction of the loader light 22 may be executed when the boom 9 is below the predetermined position. Specifically, the illumination control unit 51a cancels the lighting restriction of the work light 21 (turns this on or increases its brightness) and executes lighting restriction of the loader light 22 (turns this off or dims this) when the loader light 22 is turned on and the boom 9 is below the predetermined position. That is, lighting of the loader light 22 is restricted, and the periphery of the bucket 10 is illuminated by the work light 21. Meanwhile, when the boom 9 is raised to the predetermined position or higher, lighting restriction of the work light 21 is executed (this is turned off or dimmed), and the lighting restriction of the loader light 22 is canceled (this is turned on or has its brightness increased). That is, lighting of the work light 21 is restricted, and the periphery of the bucket 10 is illuminated by the loader light 22.

Furthermore, the above embodiments are configured to calculate the actual elongation amount of the boom cylinder 11 based on the position detection signal output from the boom position sensor 50e and to linearly determine the height position of the boom 9 from this actual elongation amount. However, a configuration may be such that the work vehicle 1 is provided with a boom position detector that detects the position of the boom 9 and the illumination control unit 51a switches between executing and canceling the lighting restriction based on position detection information from the boom position detector. Specifically, a configuration may be such that a rotation angle sensor is provided, as the boom position detector detecting the position of the boom 9, to the pivot 23 or the like; an actual angle of the boom 9 is calculated based on an angle detection signal output from the rotation angle sensor; and the height position of the boom 9 is linearly determined from this actual angle. Alternatively, a configuration may be such that an infrared sensing sensor, a magnetic switch, a rocker switch, or other sensing sensor is provided, as the boom position detector detecting the position of the boom 9, to the vehicle body 2 and the front loader 4 and an actual position of the boom 9 is detected at a fixed point by the sensing sensor. Alternatively, a configuration may be such that an imaging device is provided, as the boom position detector detecting the position of the boom 9, in the cabin 7, to the roof 7T, or the like and the position of the boom 9 is analyzed and determined based on an image shot by the imaging device.

Furthermore, in the above embodiments, the loader light 22 is respectively disposed in the lower edge portions 9U of the left and right booms 9 (left boom 9L and right boom 9R). However, as long as the periphery of the bucket 10 can be appropriately illuminated, it is possible to provide the loader light 22 to only one among the left and right booms 9R (left boom 9L and right boom 9R) or, instead of to the lower edge portion 9U of the boom 9, one side face portion, left or right, or both side face portions of the boom 9. Alternatively, it may be disposed in an upper portion of the boom 9 (for example, the bent-portion upper edge 9T) or in a plurality of these locations.

Furthermore, the above embodiments are configured so the driver can manually switch between turning the work light 21 on and off using the work-light switch (not illustrated). However, a configuration may be such that the work vehicle 1 is provided with an illuminance sensor that detects an illuminance outside the vehicle body 2 and with an automatic driving control unit that automatically turns the work light 21 on and off based on the detection of the illuminance sensor, this automatic driving control unit automatically turning on the work light 21 if the illuminance outside the vehicle body 2 falls to or below a reference value and automatically turning off the work light 21 when the illuminance outside the vehicle body 2 surpasses the reference value.

<Effects>

In this manner, the work vehicle 1 of the above embodiments is provided with: a vehicle body 2 that travels; a boom 9 attached to the vehicle body 2 to be vertically swingable; a bucket (work tool) 10 mounted to a front portion of the boom 9; a work light (first illumination lamp) 21 that is disposed in the vehicle body 2 and emits an illumination light forward; a loader light (second illumination lamp) 22 that is disposed in the boom 9 and emits an illumination light toward the bucket 10; and an illumination control unit 51a that controls the work light 21 and the loader light 22; wherein the illumination control unit 51a execute a lighting restriction of automatically turning off or dimming the work light 21 while the loader light 22 is turned on.

According to this configuration, when using the loader light 22, the work light 21 can be automatically turned off or dimmed. As such, light from the work light 21 being reflected by the boom 9 and the connecting frame 9J and blocking the view can be prevented. This enables appropriate viewing of a state of the work area in front of the vehicle body 2 and the periphery of the bucket 10 even when working by having mounted to the vehicle body 2, for example, the front loader 4 having the boom 9.

Furthermore, the illumination control unit 51a executes the lighting restriction while the boom 9 is raised to a predetermined position or higher.

According to this configuration, when the loader light 22 is turned on, if the boom 9 is raised to the predetermined position or higher, the work light 21 is automatically turned off or dimmed. As such, light from the work light 21 being reflected by the boom 9 and the connecting frame 9J can be prevented at an appropriate timing. This further improves visibility of the work area and the bucket 10 periphery when using illumination.

Furthermore, the illumination control unit 51a cancels the lighting restriction while the boom 9 is below a predetermined position.

According to this configuration, when the loader light 22 is turned on, if the boom 9 is below the predetermined position, the lighting restriction of the work light 21 is canceled. As such, the loader light 22 and the work light 21 can provide illumination in front of the vehicle body 2 (illuminate the bucket 10 periphery). This further improves visibility of the work area and the bucket 10 periphery when using illumination.

Furthermore, the predetermined position is set to be a position wherein a height of at least a portion of the boom 9 is identical to a height of the work light 21.

According to this configuration, when the loader light 22 is turned on, if at least a portion of the boom 9 is raised to the height of the work light 21, the work light 21 is automatically turned off or dimmed. As such, light from the work light 21 being reflected by the boom 9 and the connecting frame 9J can be prevented at an appropriate timing. This further improves visibility of the work area and the bucket 10 periphery when using illumination.

Furthermore, a configuration can also be such that further provided is: a loader light switch (illumination switch) 45f for manually turning the loader light 22 on and off; wherein the illumination control unit 51a executes the lighting restriction based on an operation of turning on the loader light switch 45f.

According to this configuration, the work light 21 is automatically turned off or dimmed based on the operation of turning on the loader light 22 using the loader light switch 45f. As such, light from the work light 21 being reflected by the boom 9 and the connecting frame 9J can be more reliably prevented. This enables appropriate viewing of the state of the work area and the bucket 10 periphery when using illumination.

Furthermore, further provided is: a boom position sensor (boom position detector) 50e that detects a position of the boom 9; wherein the illumination control unit 51a switches between executing and canceling the lighting restriction based on position detection information obtained from the boom position sensor 50e.

According to this configuration, lighting restriction and restriction cancelation of the work light 21 are switched between based on the position detection information of the boom 9. As such, light from the work light 21 being reflected by the boom 9 and the connecting frame 9J can be prevented at an appropriate timing. This further improves visibility of the work area and the bucket 10 periphery when using illumination.

Furthermore, further provided is: a loader operation lever (second operation apparatus) 18 for manually operating the boom 9; wherein the loader light switch 45f is provided to the loader operation lever 18.

According to this configuration, the loader light 22 can be manually turned on and off while gripping the loader operation lever 8. As such, the loader light 22 can be turned on and off rapidly according to the circumstances. This enables more appropriate viewing of the state of the work area and the bucket 10 periphery when using illumination. Moreover, usability also improves significantly.

Furthermore, the loader light 22 is disposed in a lower edge portion 9U of the boom 9.

According to this configuration, the work area and the bucket 10 periphery can be illuminated from below the boom 9. As such, compared to the loader light 22 being disposed at another location of the boom 9, the work area and the bucket 10 periphery can be more appropriately illuminated. This further improves visibility of the work area and the bucket 10 periphery when using illumination.

Furthermore, the loader light 22 is configured to be capable of directing the illumination light to in front of and behind the bucket 10.

According to this configuration, the illumination direction of the loader light 22 can be freely adjusted by a driver to match a disposition of the loader light 22 relative to the bucket 10, a shape of the front loader 4, or the like. As such, the state of the work area and the bucket 10 periphery when using illumination can be more appropriately viewed.

Furthermore, further provided is: a bracket 31 that is connected to the boom 9 and supports the loader light 22; wherein a gap S2 wherein to cables and the like disposed along the boom 9 can be inserted is defined between mutually opposing faces of the boom 9 and the bracket 31.

According to this configuration, cables and the like such as a hydraulic hose 25 and a power cable 26 can be disposed along the gap S2 defined between the boom 9 and the bracket 31. As such, these cables and the like rubbing against or getting caught on the loader light 22 and shifting an attachment orientation (illumination direction) of the loader light 22 when the boom 9 is actuated can be prevented. This enables the state of the work area and the bucket 10 periphery when using illumination to be appropriately viewed. Moreover, defects in the cables and the like caused by the rubbing and catching can also be prevented.

Furthermore, the bracket 31 is provided, on a front edge portion and rear edge portion (outer edge portion) of a top plate (opposing face portion) 31T opposing the boom 9, with a front plate 31F and rear plate 31B (flange) for preventing the cables and the like from contacting the loader light 22.

According to this configuration, when the boom 9 is actuated, even if the cables and the like disposed along the gap S2 move or bend, the front plate 31F and rear plate 31B provided in front and rear outer edge portions of the top plate 31T of the bracket 31 prevent contact with the loader light 22. As such, shifting in the attachment orientation of the loader light 22 can be more reliably prevented. This enables the state of the work area and the bucket 10 periphery when using illumination to be more appropriately viewed. Moreover, defects in the cables and the like due to contact with the loader light 22 can also be more reliably prevented. Moreover, the front plate 31F and rear plate 31B also exhibit a function as a guide (hose guide) that supports, from below, the hydraulic hose 25 that curves in the gap S2.

Furthermore, the front plate 31F and rear plate 31b extend to an outer side of the front edge portion and rear edge portion (outer edge portion) of the top plate 31T and extend inclined in a direction of widening the gap S2.

According to this configuration, the cables and the like disposed along the gap S2 are less likely to contact an end face in an extending direction of the front plate 31F and rear plate 31B of the bracket 31 even if the cables and the like move or bend significantly on the outer side of the front edge portion and rear edge portion of the top plate 31T. This can more reliably prevent defects in the cables and the like due to contact with the front plate 31F and rear plate 31B.

Furthermore, further provided is: a cabin 7 mounted on the vehicle body 2 and comprises a roof 7T; wherein the boom 9 includes a left boom 9L disposed on a left side of the boom 9 and a right boom 9R disposed on a right side of the boom 9, the work light 21 is disposed in each of a left front portion and a right front portion of the roof 7T, and the loader light 22 is disposed in each of the left boom 9L and the right boom 9R.

According to this configuration, the work area and the bucket 10 periphery can be illuminated from both left and right sides of the roof 7T and both left and right sides of the boom 9. As such, compared to the work light 21 being provided in one predetermined location of the roof 7T and the loader light 22 being provided in one predetermined location of the boom 9, the work area and the bucket 10 periphery can be more appropriately illuminated. This further improves visibility of the work area and the bucket 10 periphery when using illumination.

Furthermore, a loader operation lever (second operation apparatus) 18 of the above embodiments is an operation apparatus that is disposed in a driver's-seat portion 7S of a work vehicle 1 and is for operating a front loader 4 mounted to a vehicle body 2 of the work vehicle 1, the loader operation lever being provided with: a lever shaft 44 that extends into the driver's-seat portion 7S; a grip (grip portion) 43 that is provided to an upper extended portion (distal end portion) 44A of the lever shaft 44; and a plurality of operation switches 45 that is disposed on the grip 43 and is for causing the work vehicle 1 to execute various operations; wherein the operation switches 45 include a shuttle switching switch 45*a* for switching between forward and reverse movement of the work vehicle 1 and a shuttle restraint switch 45*e* for restraining the switching operation by the shuttle switching switch 45*a* and canceling this restraint.

According to this configuration, even when working using the front loader 4, the shuttle switching switch 45*a* and the shuttle restraint switch 45*e* can be operated while gripping the grip 43 of the loader operation lever 18. That is, the work vehicle I can be easily and appropriately switched between forward and reverse movement while operating the front loader 4 using the loader operation lever 18. This can significantly improve operability of the work vehicle 1 when using the front loader 4.

Furthermore, the shuttle switching switch 45*a* is provided in a position where it can be operated by the thumb of a hand gripping the grip 43, and the shuttle restraint switch 45*e* is provided in a position where it can be operated by another finger other than the thumb of the hand gripping the grip 43.

According to this configuration, the work vehicle I can be switched between forward and reverse movement by using the thumb to press the shuttle switching switch 45*a* while using a finger other than the thumb (for example, the middle finger) to press the shuttle restraint switch 45*e*. As such, operability of the work vehicle 1 when using the front loader 4 is further improved.

Furthermore, the grip 43 of the loader operation lever 18 is provided with a concave portion 47 that is recessed inward from a surface portion (grip outer peripheral face 43A), and the shuttle switching switch 45*a* is provided in the concave portion 47 so an operation face portion 48 does not protrude to a surface outer side of the grip 43.

According to this configuration, the fingers and the palm of the hand gripping the grip 43 are less likely to inadvertently contact the shuttle switching switch 45*a*. As such, the shuttle switching switch 45*a* being inadvertently pressed and switching forward and reverse movement of the work vehicle 1 can be prevented. Moreover, an operational feel of when the loader operation lever 18 is operated being impaired by the shuttle switching switch 45*a* can also be prevented. This further improves operability of the work vehicle 1 when using the front loader 4.

Furthermore, the operation switches 45 include a third function switch (work-tool operation switch) 45*b* that can be assigned an operation function of a bucket (work tool) 10 of the front loader 4, and the shuttle switching switch 45*a* is disposed adjacent to the third function switch 45*b*.

According to this configuration, the shuttle switching switch 45*a* and the third function switch 45*b* are disposed adjacent to each other. As such, the work vehicle 1 can be smoothly switched between forward and reverse movement while operating the bucket 10. Therefore, operability of the work vehicle 1 when using the front loader 4 is further improved. In fact, because the shuttle switching switch 45*a* and the third function switch 45*b* are switches having a higher usage frequency than the other operation switches 45, usability is also significantly improved.

Furthermore, the third function switch 45*b* is a switch that can be assigned an operation function of a work tool mounted instead of or in addition to the bucket 10 of the front loader 4.

According to this configuration, assigning an operation function of another work tool to the third function switch 45*b* enables various types of front loaders 4 to be operated using the loader operation lever 18. As such, versatility is improved.

Furthermore, the grip 43 has a grip proximal end portion (proximal end portion) 43V, which has a shape that is substantially a vertically long column extending upward from the upper extended portion (distal end portion) 44A of the lever shaft 44, and a grip horizontal extended portion (horizontal extended portion) 43W, which has a shape that is substantially a horizontally long column extending to a seat 14 side of the driver's-seat portion 7S from an upper end of the grip proximal end portion 43V, and the shuttle switching switch 45*a* and the shuttle restraint switch 45*e* are provided on the grip outer peripheral face (outer peripheral face portion of grip horizontal extended portion 43W) 43A.

According to this configuration, horizontally gripping the grip horizontal extended portion 43W so the palm covers the grip outer peripheral face 43A naturally disposes the tip of the thumb of this hand near the shuttle switching switch 45*a* provided on a grip distal end face 43T and naturally disposes a finger other than the thumb (for example, the middle finger) near the shuttle restraint switch 45*e* provided on the grip outer peripheral face 43A. As a result, the work vehicle 1 can switch between forward and reverse movement with even greater ease. This further improves operability of the work vehicle 1 when using the front loader 4.

Furthermore, a grip distal end face (distal end face portion on seat 14 side of grip horizontal extended portion 43W) 43T is inclined downward, so as to face the seat 14 side, from a front edge side, which is a distal side of the hand gripping the grip horizontal extended portion 43W, to a rear edge side on an opposite side, and at least one operation switch 45 other than the shuttle switching switch 45*a* and the shuttle restraint switch 45*e* is provided on the grip distal end face 43T.

According to this configuration, horizontally gripping the grip horizontal extended portion 43W so the palm covers the grip outer peripheral face 43A enables the operation switches 45 provided on the grip distal end face 43T to be more naturally and easily operated by the tip of the thumb of this hand. Moreover, a driver can easily view the operation switches 45 provided on the grip distal end face 43T. This further improves operability of the work vehicle 1 when using the front loader 4.

Furthermore, the grip horizontal extended portion 43W is inclined so as to head upward in extending from an upperend-portion (distal-end-portion) 44A side of the lever shaft 44 to the seat 14 side of the driver's-seat portion 7S.

According to this configuration, when the grip horizontal extended portion 43W is horizontally gripped so the palm covers the grip outer peripheral face 43A, the grip 43 can be gripped in a natural posture wherein the wrist is turned slightly outward in a horizontal orientation (opposite side of seat 14). As such, fatigue of when the loader operation lever 18 is operated is reduced. This further improves operability of the work vehicle 1 when using the front loader 4.

Furthermore, a protruding portion 43E that can engage and hold the thumb of the hand gripping the grip horizontal extended portion 43W is provided in a position, of the grip outer peripheral face (outer peripheral face portion) 43A, more toward the grip distal end face (distal end) 43T than an intermediate position in an extending direction of the grip horizontal extended portion 43W.

According to this configuration, when the grip horizontal extended portion 43W is gripped horizontally so the palm covers the grip outer peripheral face 43A, the thumb of this hand can be engaged and held by the protruding portion 43E. As such, fatigue of when the loader operation lever 18 is operated is further reduced. This further improves operability of the work vehicle 1 when using the front loader 4.

Furthermore, the operation switches 45 include a shifting switch 45d for switching gears of the work vehicle 1, and the shifting switch 45d is provided on the grip distal end face (distal end face portion on seat 14 side of grip horizontal extended portion 43W) 43T.

According to this configuration, the shifting switch 45d can be operated while gripping the grip 43 of the loader operation lever 18. That is, shifting of the work vehicle 1 can be performed while operating the front loader 4 using the loader operation lever 18. This further improves operability of the work vehicle 1 when using the front loader 4.

Furthermore, the operation switches 45 include a loader light switch 45f for switching a loader light (illumination lamp) 22 disposed in the front loader 4 on and off, and the loader light switch 45f is provided on the grip distal end face (distal end face portion on seat 14 side of grip horizontal extended portion 43W) 43T.

According to this configuration, the loader light switch 45f can be operated while gripping the grip 43 of the loader operation lever 18. That is, the loader light 22 can be switched on and off while operating the front loader 4 using the loader operation lever 18. This further improves operability of the work vehicle 1 when using the front loader 4.

Furthermore, a work vehicle 1 of the above embodiments is provided with: a vehicle body 2 that can travel; a front loader 4 mounted to the vehicle body 2; a multifunctional operation lever (first operation apparatus) 17 having operation switches 42 for operating the vehicle body 2; and a loader operation lever (second operation apparatus) 18 having operation switches 45 for operating the front loader 4; wherein the operation switches 42 of the multifunctional operation lever 17 include a shuttle switching switch (first shuttle switching switch) 42a for switching between forward and reverse movement of the work vehicle 1 and a shuttle restraint switch (first shuttle restraint switch) 42e for restraining the switching operation by the shuttle switching switch 42a and canceling this restraint, and the operation switches 45 of the loader operation lever include a shuttle switching switch (second shuttle switching switch) 45a for switching between forward and reverse movement of the work vehicle 1 and a shuttle restraint switch (second shuttle restraint switch) 45e for restraining the switching operation by the shuttle switching switch 45a and canceling this restraint.

According to this configuration, the multifunctional operation lever 17 can switch between forward and reverse movement of the work vehicle 1, and the loader operation lever 18 can also switch between forward and reverse movement of the work vehicle 1. That is, the work vehicle 1 can be switched between forward and reverse movement using either among the multifunctional operation lever 17 and the loader operation lever 18. In fact, when using the loader operation lever 18, the work vehicle 1 can be switched between forward and reverse movement while operating the front loader 4. This significantly improves operability of the work vehicle 1 when working using the front loader 4.

Furthermore, in the work vehicle 1, the multifunctional operation lever 17 and the loader operation lever 18 are disposed in a position that is on one lateral side of a seat 14 provided on the vehicle body 2 and that enables a driver seated in the seat 14 to grip and operate grips 41, 43 using the hand on this one lateral side; the shuttle switching switches (first shuttle switching switch and second shuttle switching switch) 42a, 45a are provided in a position where they can be operated by the thumb of the hand gripping the grips 41, 43; and the shuttle restraint switches (first shuttle restraint switch and second shuttle restraint switch) 42e, 45e are provided in a position where they can be operated by a finger other than the thumb of the hand gripping the grips 41, 43.

According to this configuration, when using the multifunctional operation lever 17, the work vehicle 1 can be switched between forward and reverse movement by using the thumb to press the shuttle switching switch 42a while using a finger other than the thumb (for example, the index finger) of the hand gripping the grip 41 to press the shuttle restraint switch 42e. Meanwhile, when using the loader operation lever 18, the work vehicle 1 can be switched between forward and reverse movement by using the thumb to press the shuttle switching switch 45a while using a finger other than the thumb (for example, the index finger) of the hand gripping the grip 43 to press the shuttle restraint switch 45e. That is, the work vehicle 1 can be switched between forward and reverse movement using the same finger operation in both a situation of using the multifunctional operation lever 17 and a situation of using the loader operation lever 18. This further improves operability of the work vehicle 1 when using the front loader 4.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SIGNS

1 Work vehicle
2 Vehicle body
7 Cabin
7T Roof
9 Boom
9L Left boom
9R Right boom
9U Boom lower edge portion (lower edge portion)
10 Bucket (operation tool)

18 Loader operation lever
21 Work light (first illumination lamp)
22 Loader light (second illumination lamp)
25 Hydraulic hose (cables and the like)
26 Power cable (cables and the like)
31 Light bracket (bracket)
31B Rear plate (flange)
31F Front plate (flange)
31T Top plate (opposing face portion)
45f Loader light switch (illumination switch)
50e Boom position sensor (boom position detector)
518 Illumination control unit
S2 Gap

What is claimed is:

1. A work vehicle, comprising:
a vehicle body that travels;
a boom attached to the vehicle body to be vertically swingable;
a work tool mounted to a front portion of the boom;
a first illumination lamp that is disposed in the vehicle body and emits an illumination light forward;
a second illumination lamp that is disposed in the boom and emits an illumination light toward the work tool; and
an illumination controller that controls the first illumination lamp and the second illumination lamp, wherein
the illumination controller executes a lighting restriction of automatically turning off or dimming the first illumination lamp while the second illumination lamp is turned on.

2. The work vehicle of claim 1, wherein the illumination controller executes the lighting restriction while the boom is raised to a predetermined position or higher.

3. The work vehicle of claim 2, wherein at the predetermined position, a height of at least a portion of the boom is identical to a height of the first illumination lamp.

4. The work vehicle of claim 2, further comprising:
a boom position detector that detects a position of the boom, wherein
the illumination controller switches between executing and canceling the lighting restriction based on position detection information obtained from the boom position detector.

5. The work vehicle of claim 1, wherein the illumination controller cancels the lighting restriction while the boom is below a predetermined position.

6. The work vehicle of claim 1, further comprising:
an illumination switch for manually turning the second illumination lamp on and off, wherein
the illumination controller executes the lighting restriction based on an operation of turning on the illumination switch.

7. The work vehicle of claim 6, further comprising:
an operation lever for manually operating the boom, wherein
the illumination switch is disposed on the operation lever.

8. The work vehicle of claim 1, wherein the second illumination lamp is disposed in a lower edge portion of the boom.

9. The work vehicle of claim 1, wherein the second illumination lamp is configured to be capable of directing the illumination light to in front of and behind the work tool.

10. The work vehicle of claim 1, further comprising:
a bracket that is connected to the boom and supports the second illumination lamp; and
cables disposed along the boom, wherein
a gap is defined between mutually opposing faces of the boom and the bracket, and
the cables can be inserted in the gap.

11. The work vehicle of claim 10, wherein
the bracket has a flange on an outer edge portion of a face portion opposing the boom, and
the flange prevents the cables from contacting the second illumination lamp.

12. The work vehicle of claim 11, wherein the flange extends outward from the outer edge portion and is inclined in a direction of widening the gap.

13. The work vehicle of claim 1, further comprising:
a cabin mounted on the vehicle body and comprises a roof, wherein
the boom comprises:
a left boom disposed on a left side of the boom; and
a right boom disposed on a right side of the boom,
the first illumination lamp is disposed in each of a left front portion and a right front portion of the roof, and
the second illumination lamp is disposed in each of the left boom and the right boom.

* * * * *